(12) United States Patent
East

(10) Patent No.: US 7,198,250 B2
(45) Date of Patent: Apr. 3, 2007

(54) PIEZOELECTRIC ACTUATOR AND PUMP USING SAME

(75) Inventor: W. Joe East, Grafton, VA (US)

(73) Assignee: Par Technologies, LLC, Hampton, VA (US)

( * ) Notice: Subject to any disclaimer, the term of this patent is extended or adjusted under 35 U.S.C. 154(b) by 234 days.

(21) Appl. No.: 10/388,589

(22) Filed: Mar. 17, 2003

(65) Prior Publication Data

US 2004/0000843 A1 Jan. 1, 2004

Related U.S. Application Data

(63) Continuation-in-part of application No. PCT/US01/28947, filed on Sep. 14, 2001.

(60) Provisional application No. 60/233,248, filed on Sep. 18, 2000.

(51) Int. Cl.
*F16K 31/02* (2006.01)

(52) U.S. Cl. .............. 251/129.06; 251/363; 251/364; 417/322; 417/413.2

(58) Field of Classification Search .......... 251/129.06, 251/129.01, 364, 363, 900; 417/322, 413.2, 417/413.1
See application file for complete search history.

(56) References Cited

U.S. PATENT DOCUMENTS

| | | | | |
|---|---|---|---|---|
| 2,328,805 A | * | 9/1943 | Holthouse | 251/129.01 |
| 2,829,860 A | * | 4/1958 | Garner et al. | 251/129.17 |
| 2,901,623 A | * | 8/1959 | Wouters | 251/129.06 |
| 3,936,342 A | | 2/1976 | Matsubara et al. | |
| 4,034,780 A | | 7/1977 | Horvath | |
| 4,095,615 A | | 6/1978 | Ramsauer | |
| 4,629,926 A | * | 12/1986 | Siegal | 251/129.01 |
| 4,826,131 A | * | 5/1989 | Mikkor | 251/368 |
| 4,859,530 A | | 8/1989 | Roark et al. | |
| 4,939,405 A | | 7/1990 | Okuyama et al. | |
| 5,029,805 A | * | 7/1991 | Albarda et al. | 251/129.06 |

(Continued)

FOREIGN PATENT DOCUMENTS

EP  0 202 836 A1  11/1986

(Continued)

OTHER PUBLICATIONS

International Preliminary Examination Report mailed Oct. 3, 2002 in corresponding PCT Application PCT/US01/28947.

(Continued)

*Primary Examiner*—John Bastianelli
(74) *Attorney, Agent, or Firm*—Nixon & Vanderhye, P.C.

(57) ABSTRACT

Thin chamber diaphragm-operated fluid handling devices, including thin chamber pumps and thin chamber valves, facilitate device compactness and, in some configurations, self-priming. Diaphragm actuators of the thin chamber devices either comprise or are driven by piezoelectric materials. The thinness of the chamber, in a direction parallel to diaphragm movement, is in some embodiments determined by the size of a perimeter seal member which sits on a floor of a device cavity, and upon which a perimeter (e.g. circumferential or peripheral portion) of the diaphragm actuator sits. The diaphragm actuator is typically retained in a device body between the floor seal member and another seal member between which the perimeter of the actuator is sandwiched. The devices have an input port and an output port.

9 Claims, 17 Drawing Sheets

U.S. PATENT DOCUMENTS

| | | | |
|---|---|---|---|
| 5,049,421 A | 9/1991 | Kosh | |
| 5,084,345 A | 1/1992 | Manos | |
| 5,238,223 A * | 8/1993 | Mettner et al. | 251/129.06 |
| 5,271,724 A | 12/1993 | van Lintel | |
| 5,338,164 A | 8/1994 | Sutton et al. | |
| 5,354,032 A * | 10/1994 | Sims et al. | 251/129.06 |
| 5,471,721 A | 12/1995 | Haertling | |
| 5,632,841 A | 5/1997 | Hellbaum et al. | |
| 5,759,015 A | 6/1998 | van Lintel et al. | |
| 5,779,218 A * | 7/1998 | Kowanz | 251/129.06 |
| 5,785,295 A * | 7/1998 | Tsai | 251/129.06 |
| 5,849,125 A | 12/1998 | Clark | |
| 5,876,187 A | 3/1999 | Forster et al. | |
| 5,945,768 A | 8/1999 | Treu, Jr. | |
| 6,033,191 A | 3/2000 | Kamper et al. | |
| 6,042,345 A | 3/2000 | Bishop et al. | |
| 6,060,811 A | 5/2000 | Fox et al. | |
| 6,071,087 A | 6/2000 | Jalink, Jr. et al. | |
| 6,071,088 A | 6/2000 | Bishop et al. | |
| 6,095,175 A * | 8/2000 | Miller et al. | 251/129.06 |
| 6,104,127 A | 8/2000 | Kameyama et al. | |
| 6,109,889 A | 8/2000 | Zengerle et al. | |
| 6,162,313 A | 12/2000 | Bansemir et al. | |
| 6,179,584 B1 | 1/2001 | Howitz et al. | |
| 6,189,858 B1 * | 2/2001 | Miyazoe et al. | 251/129.06 |
| 6,213,735 B1 | 4/2001 | Henco et al. | |
| 6,227,809 B1 | 5/2001 | Forster et al. | |
| 6,227,824 B1 | 5/2001 | Stehr | |
| 6,439,539 B1 * | 8/2002 | Powell | 251/129.06 |

FOREIGN PATENT DOCUMENTS

| | | |
|---|---|---|
| GB | 2 013 311 A | 8/1979 |
| GB | 2 161 902 A | 1/1986 |
| GB | 2 250 911 A | 6/1992 |
| GB | 2 262 972 A | 7/1993 |
| WO | 87/07218 | 12/1987 |
| WO | WO99/31420 * | 6/1999 |
| WO | WO99/61827 * | 12/1999 |
| WO | 01/04526 A1 | 2/2001 |

OTHER PUBLICATIONS

International Search Report mailed Jan. 24, 2002 in corresponding PCT Application No. PCT/US01/28947.

GB Examination Report mailed Nov. 9, 2004 in corresponding GB application No. GB0423682.4.

GB Examination Report mailed Jun. 4, 2004 in corresponding GB application No. GB0308623.8.

International Search Report and Written Opinion mailed Sep. 14, 2006 in corresponding PCT application No. PCT/US04/07979.

International Preliminary Report on Patentability mailed Nov. 2, 2006 in corresponding PCT Application No. PCT/US2004/007979.

* cited by examiner

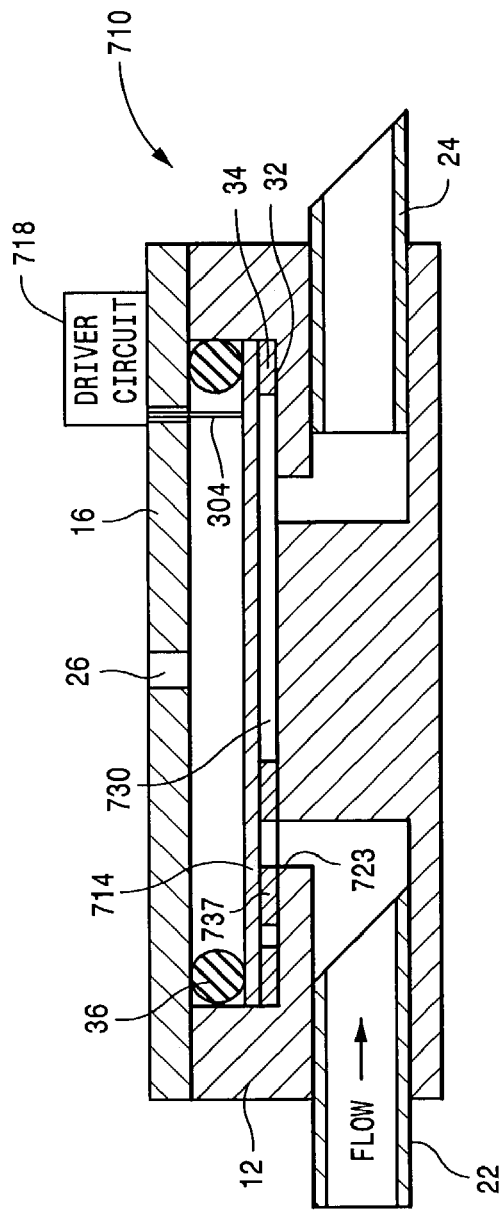
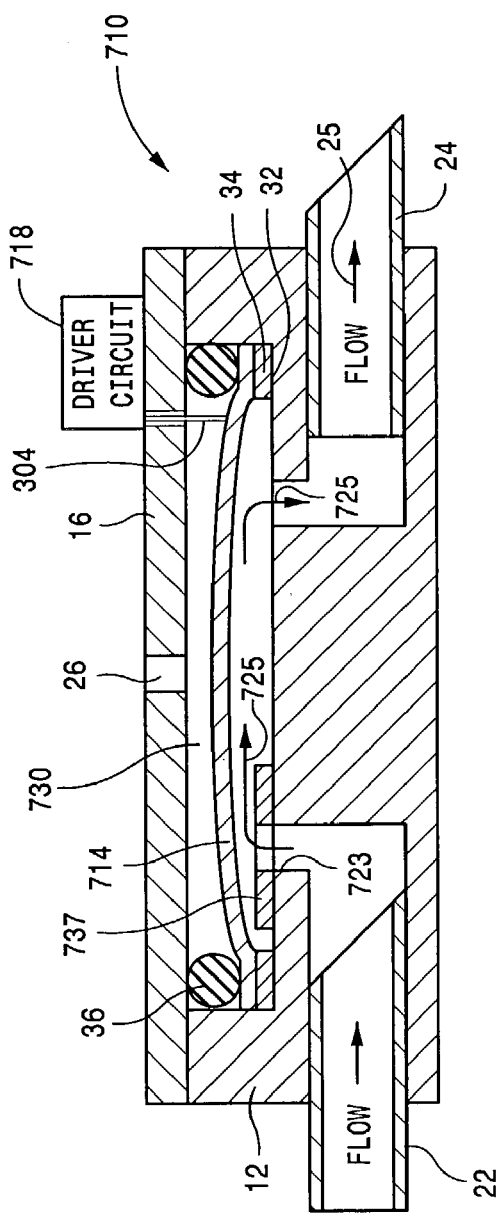
Fig. 7A
Fig. 7B

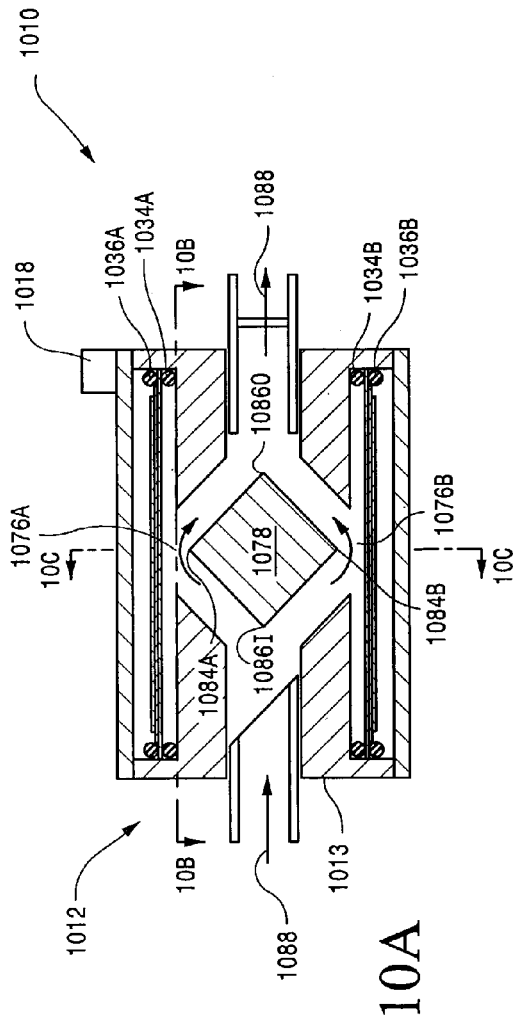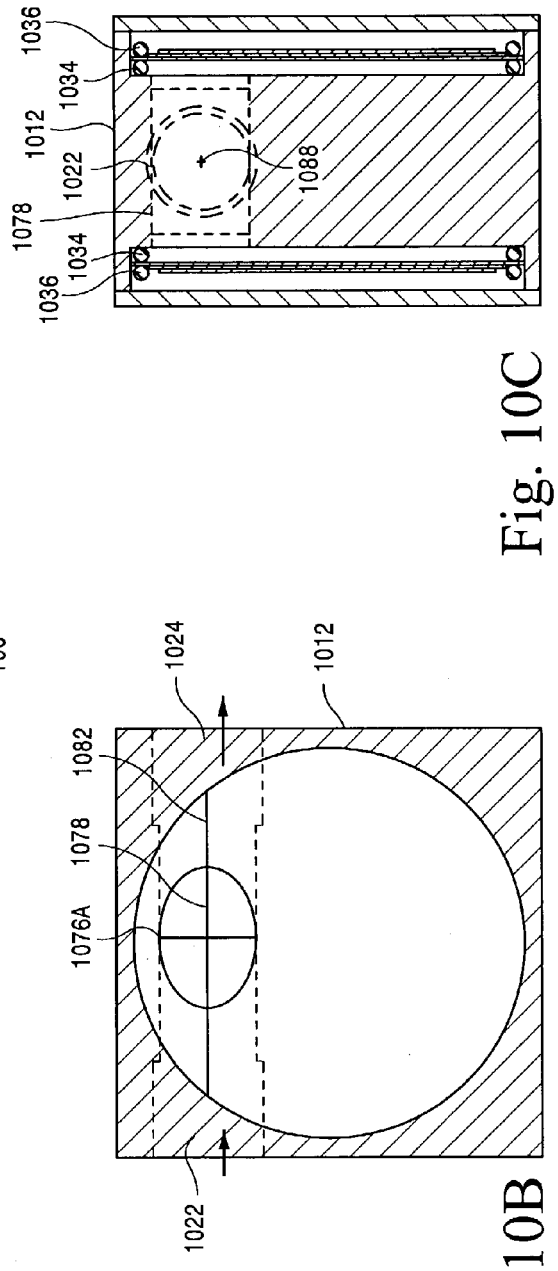
Fig. 10A
Fig. 10B
Fig. 10C

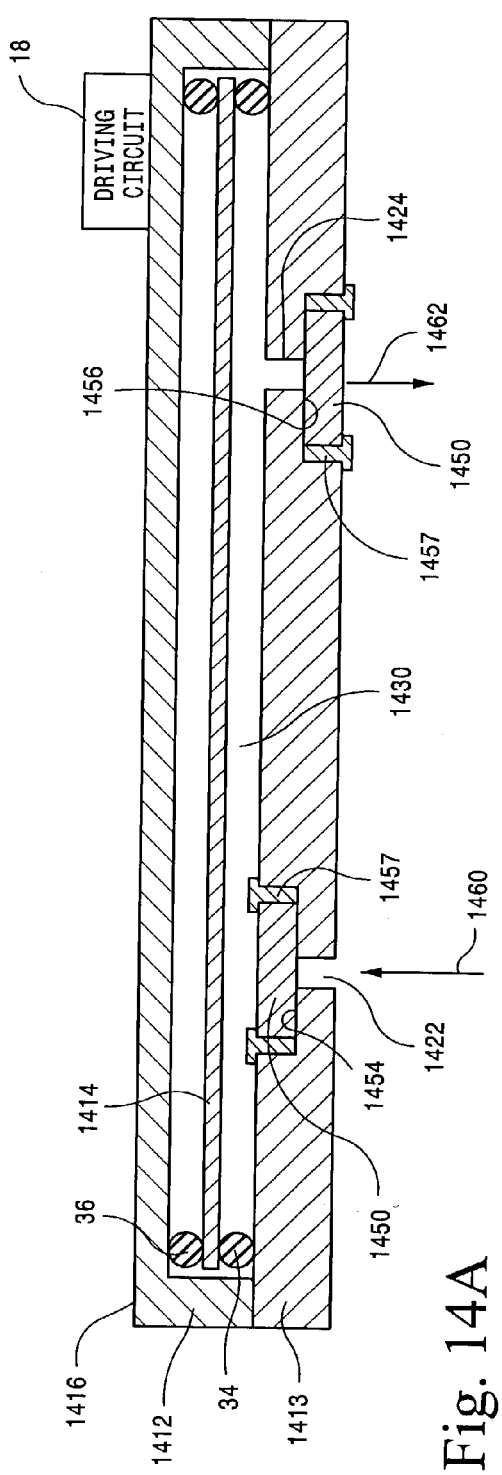
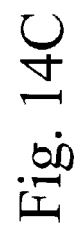
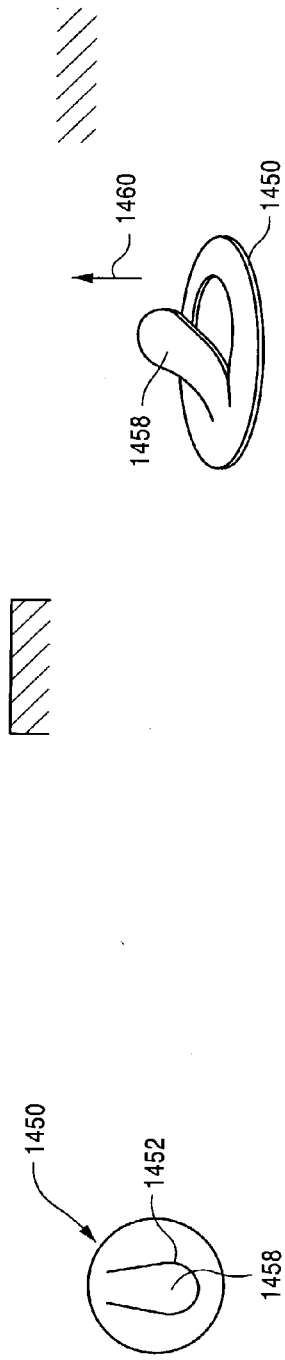
Fig. 14A
Fig. 14B
Fig. 14C

PIEZOELECTRIC ACTUATOR AND PUMP USING SAME

This application claims the benefit and priority of U.S. Provisional Patent Application No. 60/233,248 filed 18 Sep. 2000, and is a continuation-in-part of PCT patent application PCT/US01/28947 filed 14 Sep. 2001, both of which are incorporated by reference herein in their entirety.

BACKGROUND

1. Field of the Invention

The present invention is in the field of the manufacture of ferroelectric actuators and miniature diaphragm pumps using these actuators as the prime mover. In the best mode the actuators are piezoelectric.

2. Related Art and Other Considerations

Certain prior art for this invention may be grouped as follows:

U.S. Pat. Nos. 5,471,721, 5,632,841, 5,849,125, 6,162,313, 6,042,345, 6,060,811, and 6,071,087 showing either prestressing of piezoelectric actuators, or dome-shaped piezoelectric actuators, or both. This prior art is generally inapposite because the present invention does not use a prestressed or dome-shaped piezoelectric actuator.

U.S. Pat. Nos. 6,179,584, 6,213,735, 5,271,724, 5,759,015, 5,876,187, 6,227,809 showing so-called micropumps. Such pumps generally pump only a drop of fluid at a time because of the small forces and low Reynolds numbers involved, this prior art is generally inapposite.

U.S. Pat. Nos. 4,034,780, 4,095,615 showing flapper valves. These are flappers mounted on a separate hinge. No prior art was found showing a flex valve with a miniature pump.

U.S. Pat. Nos. 5,084,345, 4,859,530, 3,936,342, 5,049,421 showing use of polyimide adhesives for various purposes, including bonding metals and other materials to film.

U.S. Pat. Nos. 4,939,405, 5,945,768 showing electrical driver circuits for piezoelectric actuators, U.S. Pat. Nos. 6,227,824, 6,033,191, 6,109,889, German WO 87/07218 showing various kinds of pumps incorporating piezoelectric actuators.

BRIEF SUMMARY

Thin chamber diaphragm-operated fluid handling devices, including thin chamber pumps and thin chamber valves, facilitate device compactness and, in some configurations, self-priming. Diaphragm actuators of the thin chamber devices either comprise or are driven by piezoelectric materials. The thinness of the chamber, in a direction parallel to diaphragm movement, is in some embodiments determined by the size of a perimeter seal member which sits on a floor of a device cavity, and upon which a perimeter (e.g. circumferential or peripheral portion) of the diaphragm actuator sits. The diaphragm actuator is typically retained in a device body between the floor seal member and another seal member between which the perimeter of the actuator is sandwiched. The devices have an input port and an output port.

In one embodiment, a thin chamber valve has a port seal member seated on the floor of the device cavity and around a mouth of a controlled one of the input port and the output port. The port seal member has a thickness comparable to the perimeter seal member which defines the thinness of the valve chamber. Upon selective energization and de-energization, the actuator opens and closes the controlled port by respectively uncovering and covering the port seal member.

Thin chamber devices having dual chambers are also provided, with each of the dual chamber portions being at least partially defined by a respective actuator whose perimeter sits upon a chamber thinness-defining seal member or gasket. Dual chamber devices thus have two chamber lateral portions. Typically a central wall divides the two opposing chamber lateral portions, with an inlet port and an outlet port extending into peripheral end portions of the central wall. The inlet and outlet ports communicate with one or more chamber central portions, with transmission of fluid between the central chamber portions occurring through certain windows. A diverter portion of the central wall influences the configuration of the windows and flow of fluid between the ports and the dual chamber lateral portions. Differing shapes or configurations of diverters are provided. The diaphragm actuators for the dual chamber are simultaneously driven or actuated so that both chamber portions simultaneously drawn in, then expel, fluid.

Implementations of some embodiments of thin chamber pumps utilize a wicking material situated for, e.g., the purpose of facilitating priming of the pump with a liquid by capillary action. In one implementation, the wicking material is situated either to fully or partially occupy in the pumping chamber. Instead of or in addition to a pump having wicking material in its pumping chamber, the inlet port of a pump may also contain wicking material. Such wicking material can either fully or partially occupy the inlet port. In the implementations in which wicking material occupies at least some of the pumping chamber and at least some of the inlet port, the wicking materials may be integral or separately formed but positioned for physical contact. The wicking material is preferably a microfiber fabric or wicking foam material. The wicking material situated in the pump chamber may have various features such as holes aligned with ports of the pump, or even channels interconnecting such holes. A self-priming method is also provided for a pump having wicking material.

A unique flapper valve is provided for optional use with thin chamber devices. The flapper valve comprises a thin wafer (e.g., a circular silicon wafer) having a cut therein. The shape of the cut (e.g., U-shaped)-defines a flexible flapper which responds to movement of the diaphragm for opening and closing the flapper valve.

In some embodiments a valve chamber has an elastomeric wall. A piezoelectric element of the valve is operable in a first state to configure the elastomeric wall to a first position and to close a controlled port, and in a second state to configure the elastomeric wall to a second position and to open the controlled port. The entire valve chamber may be elastomeric, and may be integrally formed. The piezoelectric member is external to the valve chamber and acts through an actuator rod on the valve chamber. The piezoelectric member is thus not contacted by fluid in the valve chamber.

BRIEF DESCRIPTION OF THE DRAWINGS

The foregoing and other objects, features, and advantages will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7A and FIG. 7B are schematic cross sectional front views showing a thin chamber valve having a piezoelectric actuator, FIG. 7A showing de-energization of the piezoelectric actuator and FIG. 7B showing energization of the piezoelectric actuator.

FIG. 10A is a schematic cross sectional front view of a thin chamber pump according to another example embodiment; FIG. 10B is a cross sectional top view of the pump of FIG. 10A taken along the line 10B; FIG. 10C is a cross sectional side view of the pump of FIG. 10A taken along the line 10C.

FIG. 13-1 through FIG. 13-5 are schematic front views illustrating certain basic, representative steps of a method of self-priming a pump such the pump of FIG. 11A.

FIG. 14A is a schematic cross sectional front view of a thin chamber pump according to an example embodiment.

FIG. 14B is top view of a flapper valve included in the pump of FIG. 14A.

FIG. 14C is a diagrammatic perspective view of an open flapper valve included in the pump of FIG. 14A.

DETAILED DESCRIPTION

In the following description, for purposes of explanation and not limitation, specific details are set forth such as particular compositions, processes, techniques, etc. in order to provide a thorough understanding of the present invention. However, it will be apparent to those skilled in the art that the present invention may be practiced in other embodiments that depart from these specific details. In other instances, detailed descriptions of well-known ingredients, steps, or operations are omitted so as not to obscure the description of the present invention with unnecessary detail.

Figure 1:
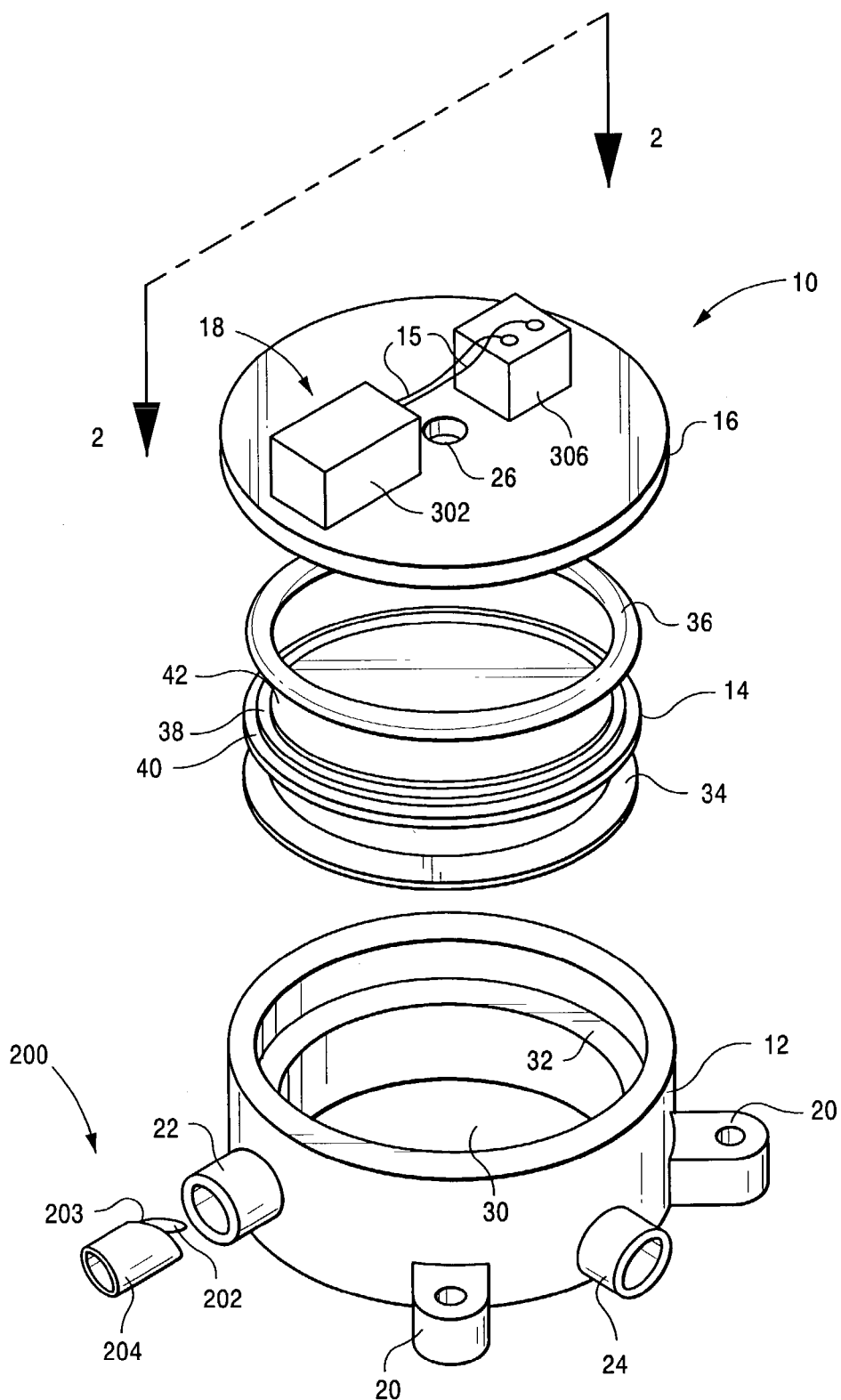
FIG. 1 is a perspective view of the pump according to an embodiment of the invention.

FIG. 1 shows how the piezoelectric actuator of the present invention may be used in a miniature diaphragm pump. The pump 10 is generally in the form of a circular short cylinder. It includes the pump body 12, piezoelectric actuator 14, pump cover 16 and piezoelectric actuator electronic driver circuit 18. The pump body 12 has lugs 20 for mounting the pump to any substrate. Inlet 22 and outlet 24 are part of the pump body 12 though they could be separate pieces otherwise fastened to the pump body. The pump cover 16 is essentially the same diameter and of the same material as the pump body 12. The material would ordinarily be of a standard plastic such as acetal[DELRIN®], PVC, or PC, or of a metal such as stainless steel or brass. These are preferable since they can be easily machined or thermally formed. The cover 16 may be fastened to the pump body 12 by any means such as by a fast-curing adhesive while the pump body 12 and cover 16 are under compression such as by clamping. The pump cover has an opening 26 for venting the space above the actuator 14.

Figure 2:
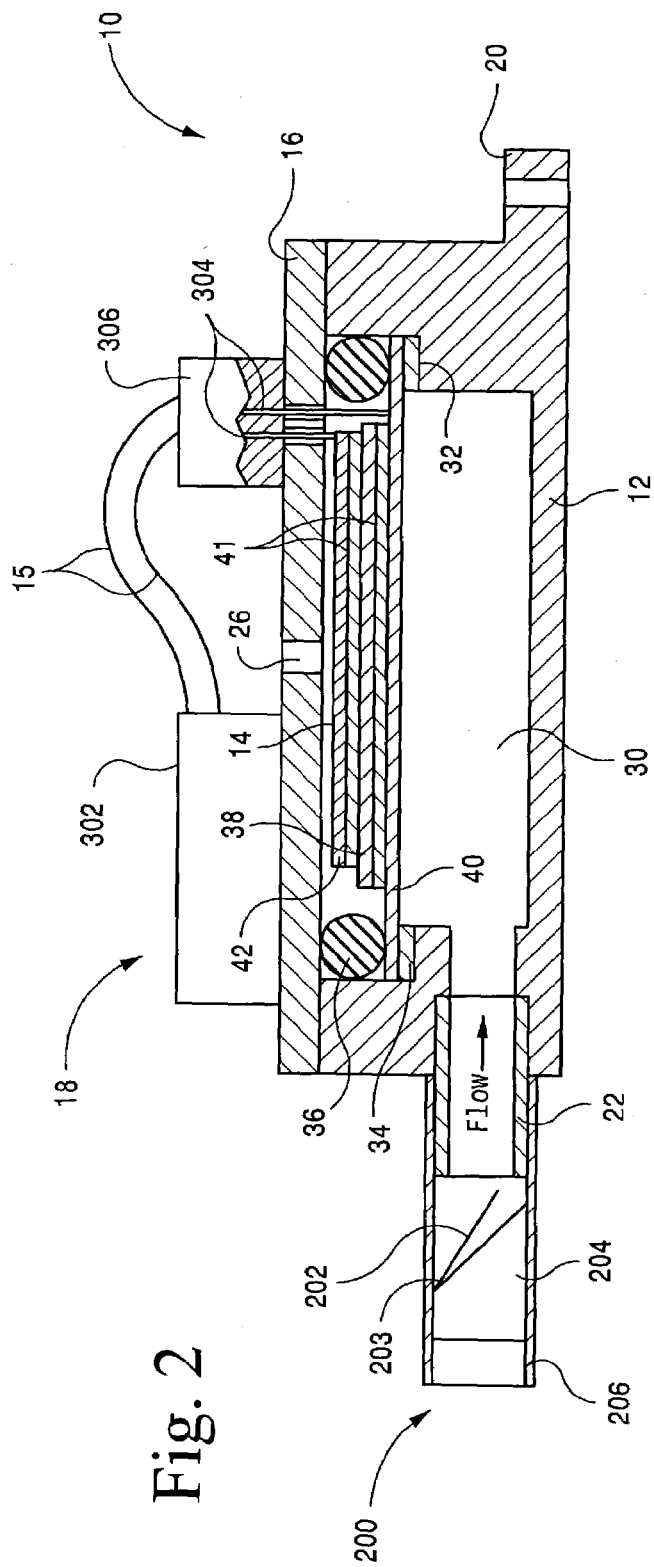
FIG. 2 is a sectional view of the pump along line 2—2 of FIG. 1.

The dimensions of the pump depend on the particular application. In the best mode the pump body 12 is about 40 mm [1.5 inch] in diameter. A pump chamber 30 is formed in the center of the pump body 12, for example by molding or machining. The pump chamber 30 is about 28 mm [1.125 inch] in diameter or about 3 mm [⅛ inch] less in diameter than the diameter of the piezoelectric actuator 14. The chamber 30 is about 6 mm [0.25 inch] deep. A seat 32 about 3 mm [0.125 inch] wide and about 2 mm [0.070 inch] deep is provided in the pump body 12 at the top of the pump chamber 30. As shown in FIG. 2 the piezoelectric actuator 14 is mounted on the seat 32 to form the diaphragm in the top of the pump chamber 30.

To assemble the pump a sealing washer 34 the same diameter as the piezoelectric actuator is put on the seat 32 to seal the pump chamber when the, piezoelectric actuator 14 is put in place. The sealing washer 34 may be of a relatively soft material such as Buna-N or silicon rubber to account for any irregularities in the mating surfaces and ensure a good seal between the actuator 14 and the pump body 12. Once the piezoelectric actuator 14 is in place an O-ring seal 36 is placed on top of the piezoelectric actuator 14 to hold the piezoelectric actuator 14 in place and seal it from the cover 16. The cover 16 of the same outside diameter as the pump body 12 base but only about ⅛ inch thick is then put in place. Sealing washer 34 and O-ring seal 36 are referred to collectively as the pump seals, even though they both have the additional function of fixing the actuator 14 in place with respect to the pump body 12. The cover 16 is then fastened to the body 12 while under compression, for example by adhesive under clamping pressure, to seal the piezoelectric actuator 14 to the body 12 and fix the actuator 14 in place to allow pumping action.

The process for making the piezoelectric actuator 14 generally is as follows:

A piezoelectric wafer 38 formed of a polycrystalline ferroelectric material such as PZT5A available from Morgan Electro Ceramics is obtained. As the name implies this material is actually a ceramic. It is processed into the high displacement piezoelectric actuator 14 by laminating the piezoelectric wafer 38 between a metal substrate layer 40 and an outer metal layer 42 as shown in FIG. 2, where the thicknesses of the three layers and the adhesive between them are exaggerated for clarity. The bonding agent 41 between the layers 38 and 40 is a polyimide adhesive. This lamination process does several things: It ruggedizes the piezoelectric actuator 14 because the metal layers keep the piezoelectric from fracturing during high displacement. It permits higher voltage due to the relatively high dielectric constant of the polyimide adhesive, thereby allowing up to about twice the displacement of a conventional piezoelectric. Being laminated between metal layers using a high performance polyimide adhesive makes the piezoelectric actuator highly resistant to shock and vibrations. With this invention piezoelectric actuator devices can be used in environments as hot as a continuous 200° C., compared to only 115° C. for a conventional piezoelectric. The significant increase in temperature is due to the polyimide adhesive used in the bonding process which is unaffected by temperatures up to 200° C. Epoxy adhesives used in conventional piezoelectrics normally can withstand temperatures up to only 115° C. This increase in operating temperature would allow the pumps of this invention to be used in a variety of pump applications, even pumping boiling water continuously.

The piezoelectric wafers 38 are available from the vendor mentioned above in various shapes and thicknesses. For the invention circular wafers 25 mm [1.00 inch] in diameter and 0.2 mm [0.008 inch] thick were found to be optimum. Square wafers were tried but did not give maximum displacement. In general the thinner the wafer, the greater the displacement at a given voltage, but the lower the force. The 0.2 mm [8-mil] thickness gives the best flow rate for the diameter of the wafer.

In the best mode stainless steel 0.1 mm [0.004 inch] thick is used for the to substrate layer 40, the layer in contact with the pumped liquid. Stainless steel is chosen for its compatibility with many liquids, including water, its fatigue resistance, its electrical conductivity and its ready availability at low cost. Aluminum 0.05 mm [0.001 inch] thick is used for the outer layer 42 primarily for its electrical conductivity in transmitting the actuating voltage to the piezoelectric wafer 38 across its surface, but also for its robustness and ready availability at low cost.

The diameter of the piezoelectric wafer 38 being about 25 mm [1 inch] as noted above, the diameter of the substrate layer 40 is about 40 mm [1.25 inch]. The setback of the wafer 38 from the edge of the substrate layer 40 is an important feature of some embodiments which seek higher actuator displacement and thus higher flow. This leaves a rim that serves as a clamping surface for the actuator assembly. This means that the entire piezoelectric wafer 38 is free and relatively unconstrained, except insofar as it is bonded to the substrate 40 and the outer layer 42. This allows maximum displacement of the actuator 14, ensuring maximum flow of liquid through the pump.

The diameter of the outer layer 42 is smaller than the diameter of the wafer 38. This setback of the outer layer 42 from the edge of the wafer 38 is done to prevent arcing over of the driving voltage from the outer layer 42 to the substrate layer 40.

Other materials and thicknesses may be used for the enclosing layers 40 and 42 as long as they meet the requirements noted.

Of special note is that the piezoelectric actuator of the invention is flat. In much of the prior art the actuator is dome-shaped, it being supposed that this shape is necessary for maximum displacement of the actuator and therefore maximum capacity of the pump for a given size actuator. Special molds and methods are proliferated to produce the shapes of the actuator considered necessary, or to produce a prestress in, the actuator that is supposed to increase its displacement. Our tests of the invention have shown, however, that a dome shape is not necessary, and that the flat actuator has a higher pumping capacity for a given size than any known pump in the prior art. As such the actuator is much simpler to produce in large quantities, as the following will demonstrate. The flat shape also means that the pump may be smaller for a given application. A flat actuator is also inherently easier to mount in any given application than a dome shaped actuator would be. Furthermore, pumps using the actuator have been shown to have sufficiently long life for numerous applications.

The process for making the piezoelectric actuator 14 specifically is as follows:

1. The piezoelectric wafer 38 and enclosing layers 40 and 42 are cleaned using a solvent that does not leave a residue, such as ethanol or acetone. All oil, grease, dust and fingerprints must be removed to ensure a good bond.

2. The piezoelectric wafer 38 is then coated on both sides with a thin layer 41, not more than 0.1 mm [0.005 inch], of a high performance polyimide gel adhesive such as that available from Ranbar Inc. The gel should contain a minimum of 25% solids to allow sufficient material for a good bond after the solvent is driven off.

3. The piezoelectric wafer 38 is then placed under a standard heat lamp for about 5 minutes to remove most of the solvent from the gel and start the polyimide gel polymerization process. Both sides of the piezoelectric must be cured under the heat lamp since both sides are to be bonded to metal.

4. Once the adhesive is dry to the touch, the piezoelectric wafer 38 is then placed between the substrate layer 40 and the outer layer 42.

5. The assembly is placed in a special press. This press was developed specifically for making piezoelectric actuators 14 and provides uniform temperature and pressure to ensure a good bond between the three components of the actuator. Referring to the best mode shown in FIG. 3 the press comprises two 300 mm [12 inch]square by 6 mm [¼ inch] thick plates of aluminum 101 held together with thumbscrews 102, four on each edge. To ensure uniform pressure while in the press, the bottom plate 101 of the press is covered with a sheet of low cost polyimide film 104 such as Upilex available from Ube Industries Ltd. The piezoelectric actuators 38 are placed on the film and a sheet of high temperature, 4 mm [⅛ inch] thick rubber 106 is placed over the piezoelectric actuators. The rubber on top and the film on bottom cushion the piezoelectric actuators 38 providing even distribution of pressure when the press is taken to temperature. Of course other dimensions of the press plates are possible.

6. Once the piezoelectric actuators are placed in the press the thumb screws 102 are made finger tight.

7. The press is then placed in a standard convection oven for thirty minutes at about 200° C.

8. The press is removed from the oven, allowed to cool to a safe temperature, and the actuators 14 removed from the press.

The press 100 is the result of an effort to develop a low cost, rapid process for manufacturing piezoelectric actuators. The press takes advantage of the thermal expansion of the aluminum plates 101 which creates the necessary pressure to cause the polyimide adhesive to bond to the piezoelectric wafer 38 and metal layers 40, 42 while it is at curing temperature. The press can be put into the oven, and taken out, while the oven is at temperature thereby allowing continuous operation during the manufacturing process. The abrupt change in temperature does not affect the piezoelectric actuators 14 since they will remain under pressure even while the press is removed from the oven and allowed to assume room temperature.

Of special note is that this press process is one of further driving off the solvent and curing the polyimide at a relatively low temperature. Prior art processes for making similar piezoelectric actuators require the mold/press to be taken to much higher temperatures, high enough to melt the polyimide adhesive. Furthermore, since such high temperatures depole the piezoelectric ceramic, it is necessary to pole it again at the end of the process. The present invention eliminates this step altogether, thus contributing to the lower cost of manufacturing the piezoelectric actuators.

Using these simple methods and hardware it is possible to manufacture hundreds of thousands of piezoelectric actuators 14 per month, or even more, depending on the scale of the operation desired.

The principle of the piezoelectric actuator pump 10 is the same as for any diaphragm pump. Normally the diaphragm in a diaphragm pump is operated by a cam or a pushrod connected to a motor or engine. This is not the case in the piezoelectric actuator pump 10. The piezoelectric actuator 14 acts as the diaphragm and moves when a pulsed electric field is imposed across the piezoelectric wafer 38 by means of the enclosing layers 40 and 42. This varying electric field causes the piezoelectric actuator 14 to expand and contract. As the actuator 14 expands, with its edge constrained, it assumes a slight dome shape as the center of the actuator moves away from the pump chamber 30. This draws liquid into the pump chamber 30 through the inlet 22. When the piezoelectric actuator 14 contracts it moves toward the liquid, forcing it out of the pump chamber 30 through outlet 24.

One of the problems with prior art piezoelectric actuators has been the voltage necessary to drive the piezoelectric. To provide power to the piezoelectric actuator pump 10 the electrical driver 18 shown in FIG. 4 was invented that converts the voltage from any six volt d.c. power source to an alternating current of over 200 volts peak-to-peak. This voltage is sufficient in the preferred embodiment to drive a piezoelectric actuator to attain the pumping rates noted above. In the circuit in FIG. 4 point A is connected to the substrate layer 40 while point B is connected to the outer layer 42.

Figure 4:
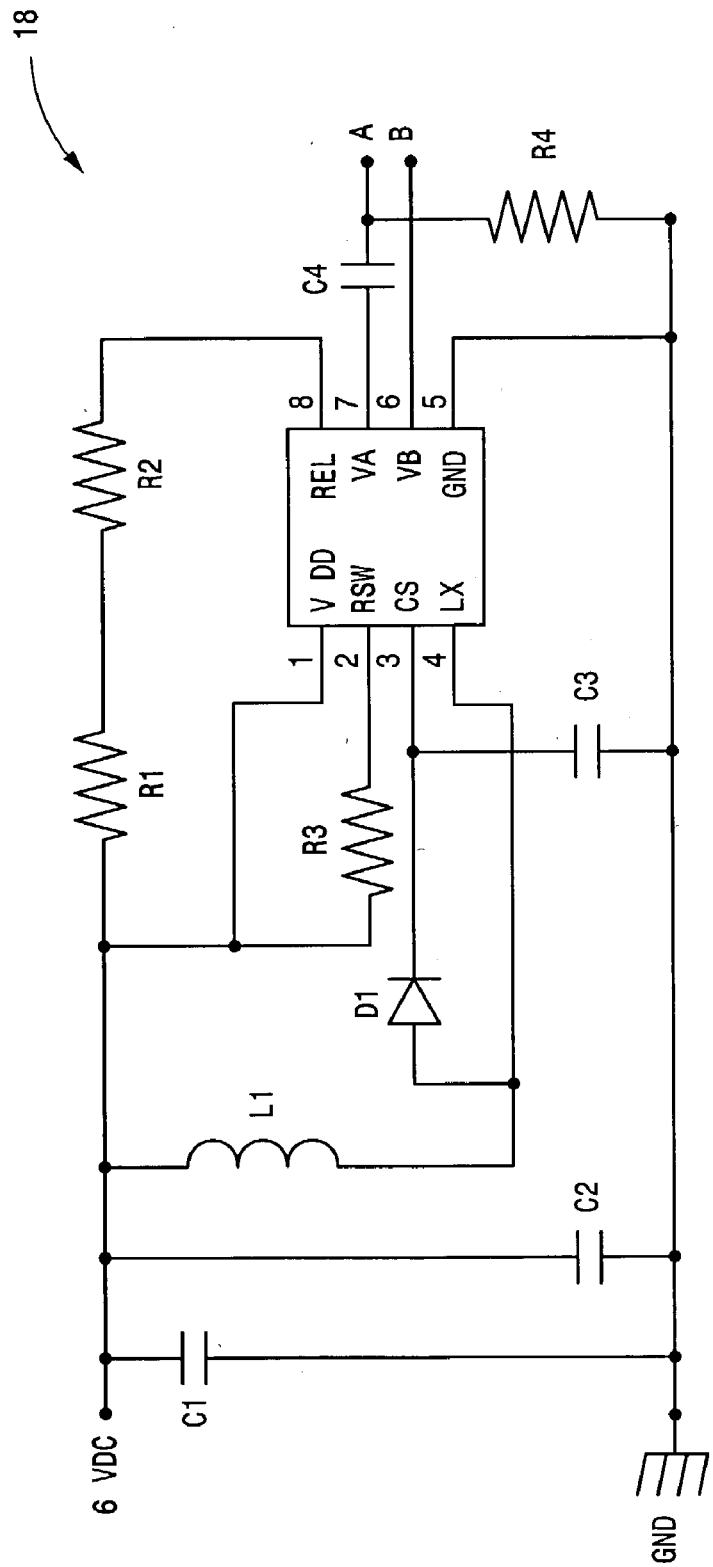
FIG. 4 shows the driver circuit for the piezoelectric actuator used with the pump.

Piezoelectric actuators perform better when the peak-to-peak voltage is not evenly balanced. They respond better to a positive voltage than the same negative voltage. Thus the circuit 18 has been designed to produce alternating current with the voltage offset to 150 volts positive and 50 volts negative. This is sufficient voltage for the piezoelectric actuator to make a very efficient pump. While a sinusoidal wave will work, at the lower frequencies and voltages, a square wave makes the piezoelectric more efficient. Values of the circuit components in FIG. 4 are as follows:

| | |
|---|---|
| R1 - 8 to 20 MΩ | C2 - 0.1 µF |
| R2 - 8 to 20 MΩ | C3 - 0.1 µF[200v] |
| R3 - 680 KΩ | C4 - 0.47 µF[200] |
| R4 - 1 MΩ | L1 - 680 µH |
| C1 - 0.1 µF | D1 - BAS21 diode |

U1 is an IMP 528 chip designated an electroluminescent lamp driver. In this circuit, with the other components, it serves to shape the pulses and amplify them to the 200 volt peak-to-peak value needed to drive the piezoelectric actuator 14. The values of R1 and R2 are chosen to vary the frequency of the output between about 35 Hz and about 85 Hz, depending on the particular application. It should be understood that the IMP 528 is just one example of electroluminescent lamp driver that can be utilized as or part of a drive circuit for the pumps and valves herein described. Moreover, other types of drive circuits, e.g., micro-controller or microprocessor-based drive circuits can also be utilized.

This circuit is composed of miniaturized components so it may be contained in a box 302 approximately 25 mm [1 inch] square by 6 mm [¼ inch] deep. It has only eleven off-the-shelf surface mount components. The box 302 may be mounted anywhere in proximity to the pump 10. In the best mode it is mounted on top of the pump, as shown in FIGS. 1 and 2, for example by an appropriate adhesive. Leads 15 run from the driver circuit 18 and are fastened to spring loaded contacts 304 such as those sold by the ECT Company under the trademark POGO®. These contacts 304 are mounted in a box 306 on top of pump cover 16 and project through the pump cover 16 to make contact with the two layers 40 and 42. This small driver circuit eliminates the need for the large power supplies and transformers used in prior art piezoelectric applications. Alternatively the leads 15 could be run through an opening in the cover 16 and fastened electrically to the layers 40 and 42, as by soldering. O-ring 36 is soft enough to accommodate the soldered point on the substrate layer 42.

Several conventional types of one-way valves were evaluated as inlet and outlet valves for the piezoelectric actuator pump 10. All had various drawbacks including bulk and poor response to the dynamic behavior of the piezoelectric actuator 14. An inline flex valve 200 was invented that is well adapted to the action of the piezoelectric actuator 14 as shown in FIG. 2. The working element of the flex valve is an elliptical disk 202 of polyimide film about 0.05 mm [0.002 inch] thick. The disk 202 is the same size and shape as the end of a short piece of rigid tube 204 formed at about a 45° angle to the axis of the rigid tube 204. The inside diameter of the rigid tube 204 is the same as the inside diameter of the inlet 22 or outlet 24 of the pump body 12. Rigid tube 204 is captured in the end of the flexible system conduit 206 which slips over the inlet/outlet 22,24 and carries the system liquid, as shown in FIG. 2. Valve disk 202 is attached to the nether end of the slanted surface at the point designated 203 by any sufficient means such as by adhesive or thermal bonding. A similar flex valve 200 may be placed in the outlet 24. Both disks 202 of both valves would point in the same direction downstream. However, it was found in operating the pump 10 that it would pump at full capacity with no valve at all in the outlet. It is postulated that the liquid in the inlet circuit, even with the inlet valve partially open, provides enough inertia to act as a closed inlet valve. At least for some embodiments, operation with only the inlet valve is considered to be the best mode.

This flex valve 200 is of absolute minimum bulk. The mass of the disk 202 is also about as light as it could possibly be so it reacts rapidly to the action of the actuator 14. When it is open it presents virtually no resistance to the system flow. Mounted at the 45° angle, it has to move through an angle of only 45° to fully open, whereas if it were mounted perpendicular to the flow it would have to move through an angle twice as large. It is of extreme simplicity and low cost of materials and fabrication. Also no part of the valve 200 projects into pump chamber 30. This minimizes the volume of pump chamber 30 which helps make the pump self-priming and increases its efficiency. Further contributing to these characteristics is that the flex valve 200 is biased closed when the pump is not operating.

Figure 5:
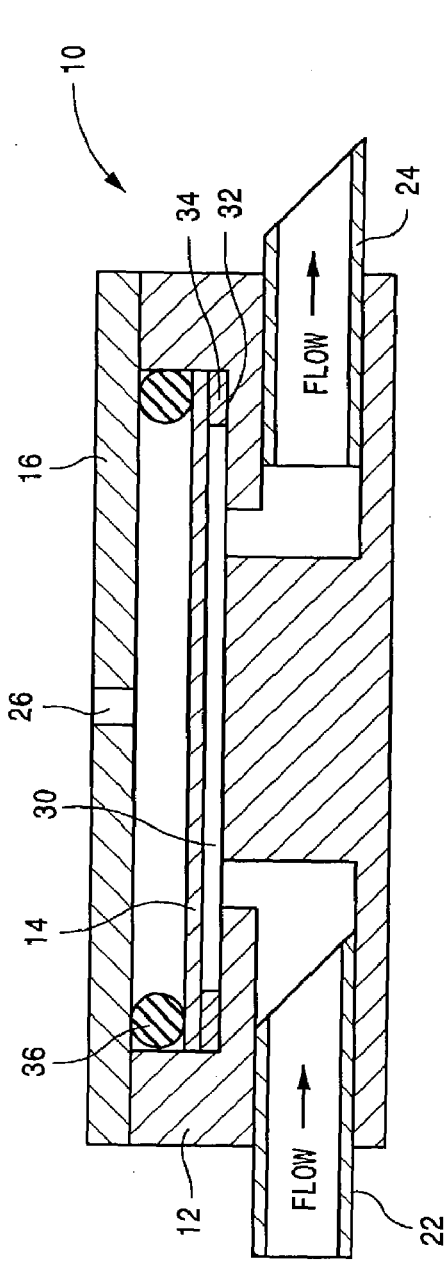
FIG. 5 is a partially diagrammatic view showing an alternative embodiment of the invention in which the pump chamber is reduced in size.
Figure 6:
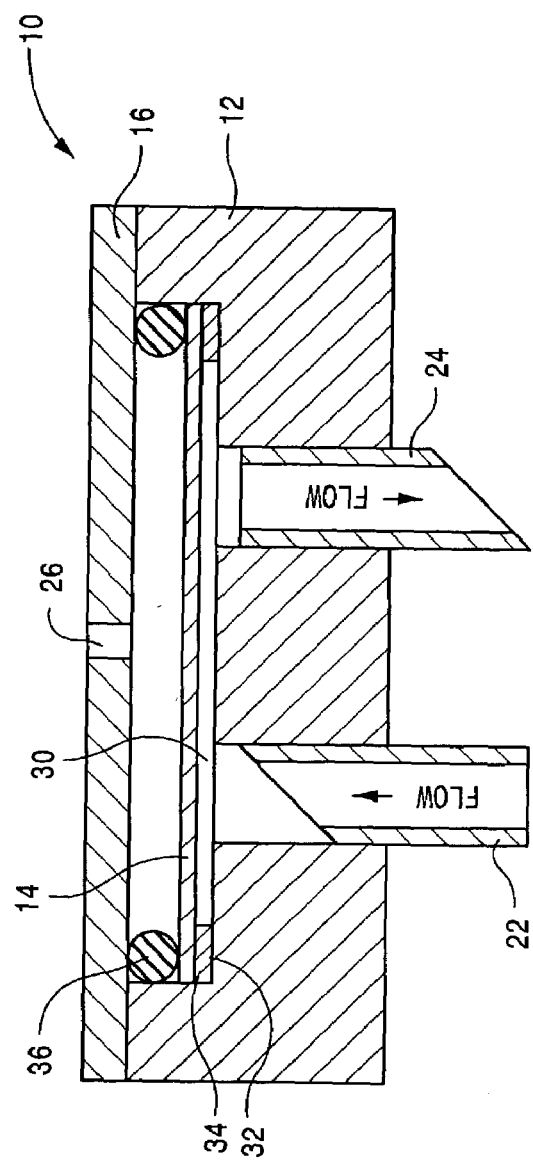
FIG. 6 is a partially diagrammatic view showing another alternative embodiment of a pump in which the inlet and outlet are perpendicular to the plane of the actuator.

FIGS. 5 and 6 show alternative embodiments of the pump of the invention. The pump in FIG. 5 is essentially the same as that of FIG. 2 except that the pump chamber 30 is reduced in thickness to that of the sealing washer 34. This improves the self-priming ability of the pump. The pump in FIG. 6 also has a minimally thick pump chamber 30. Further, the inlet 22 and outlet 24 are perpendicular to the plane of the actuator 14, a configuration that may be more convenient in some applications.

In yet another embodiment, not shown, the bottom of the pump body comprises a piezoelectric actuator 14 arranged identically but as a mirror image of the piezoelectric actuator 14 just described, with the substrate layers 40 facing each other across the pump chamber 30.

In still another embodiment, not shown, two of the pumps above described are mounted side by side in one pump body. The actuator; seals; inlets and outlets, with one-way valve in the inlets only; pump covers; and drivers are positioned in one or more of the configurations described above. In a preferred form of this embodiment, the drivers are in series electrically, with the pumps operating in parallel fluidwise in the system in which they are deployed.

FIG. 7A and FIG. 7B show a valve 710 which resembles pump 10 of FIG. 5 in having a thin chamber 730. A piezoelectric actuator 714 is provided to at least partially define valve chamber 730. As in the manner previously described, the piezoelectric actuator 714 comprises an essentially planar piezoelectric element (such as piezoelectric wafer 38) having an essentially planar fluid-contacting layer (e.g., metal substrate layer 40) adhered thereto. As with the piezoelectric actuators for all embodiments described herein, the piezoelectric actuator 714 can be fabricated with a piezoelectric element which is sandwiched (e.g., by polyimide adhesive) between a metal substrate layer and an outer metal layer. In each of the embodiments described herein, the layers of the piezoelectric actuators can be configured in either of two possible configuration modes. In a configuration first mode, already described with respect to FIG. 2, for example, the metal substrate layer can have a diameter larger than the other layers comprising the piezoelectric actuator to provide, e.g., the setback which is useful for clamping the metal substrate layer only, and thereby achieving higher displacement and flow. In a second configuration mode, illustrated previously by FIG. 5 and FIG. 6 and also by FIG. 7A and FIG. 7B and some other embodiments, the layers comprising the piezoelectric actuator can have essentially the same diameter, thereby providing a shorter moment of force and thus a higher pumping pressure. Regardless of how illustrated or described, it should be understood that each embodiment is susceptible to either mode of piezoelectric actuator configuration.

The valve 710 has a body 12 for at least partially defining the valve chamber 730. The valve chamber 730 has an inlet port 22 and an outlet port 24. One of the inlet port 22 and the outlet port 24 is considered a "controlled" port. In the non-limiting example herein described, the inlet 22 is preferably designated as the controlled port.

As in the FIG. 5 embodiment, the piezoelectric actuator 714 of valve 710 has its circumference resting on valve chamber sealing washer 34, also known as a valve chamber perimeter gasket. The periphery of the floor (or bottom wall) of the valve chamber 730 is the seat 32 upon which valve chamber sealing washer 34 is positioned. In FIG. 7A and FIG. 7B, however, a port sealing gasket 737 is situated on the floor of valve chamber 730 around a mouth 723 of the controlled port, e.g., inlet 22. The port sealing gasket 737 has an interior diameter which approximates the diameter of mouth 723 of inlet 22. The outer diameter of port sealing gasket 737 is, of course, larger than its interior diameter, but smaller than the interior diameter of the valve chamber sealing washer 34. The thickness of port sealing gasket 737 is approximately the same thickness as the thickness of valve chamber sealing washer 34.

As in the case for actuators for other embodiments described herein, the piezoelectric actuator 714 of valve 710 of FIG. 7A and FIG. 7B is preferably fabricated generally in the manner described above. The piezoelectric actuator 714 is connected to a driver circuit 718. The driver circuit 718 can be, for example, of the type previously described.

The piezoelectric actuator 714 of valve 710 of FIG. 7A and FIG. 7B performs a valving function. In particular, in the state shown in FIG. 7A, no power is applied to the driver circuit 718, so that no electromagnetic field is applied to piezoelectric actuator 714. In the de-energized state of FIG. 7A, a bottom or fluid-contacting surface of the piezoelectric actuator 714 rests against the port sealing gasket 737, thereby preventing fluid from entering from port 22 into valve chamber 730. That is, the de-energized piezoelectric actuator 714 impedes flow into the chamber 730, thereby acting as a valve. The metal substrate layer 40 of the piezoelectric actuator 714 actually sits on the port sealing gasket 737 to stop liquid from entering from inlet 22 into chamber 730. The metal substrate layer 40 is preferably a membrane of stainless steel or other element having a suitably high coefficient of thermal expansion, such as aluminum, beryllium, brass, or copper, for example.

On the other hand, when voltage is applied to driver circuit 718, the piezoelectric actuator 714 is in an energized state (e.g., has an electromagnetic field applied thereto) and moves away or deflects from the port sealing gasket 737 essentially in the manner shown in FIG. 7B. When the piezoelectric actuator 714 is moved away from port sealing gasket 737, fluid is then able to flow from inlet 22 into valve chamber 730, and then out of valve chamber 730 via the outlet 24 in the manner depicted by arrows 725 in FIG. 7B.

In the quiescent state in which no power is applied to driver circuit 718, the piezoelectric actuator 714 closes inlet 22 and thus the valve. But when a proper voltage (e.g., 3 VDC to 16 VDC) is applied to driver circuit 718, the piezoelectric actuator 714 is actuated and moves away from port sealing gasket 737, allowing fluid to move through valve chamber 30 and thus through the valve 710.

The valve 710 of FIG. 7A and FIG. 7B thus employs piezoelectric actuator 714 rather than a solenoid to control fluid flow. The valve 710 employs a ruggedized piezoelectric actuator 714 and driver circuit 718 which provides the necessary displacement for piezoelectric actuator 714 to function as a valve. Yet the orientation of inlet port 22 and outlet port 24 relative to body 12 may vary.

In the FIG. 7A and FIG. 7B embodiment, when the controlled port (e.g., inlet 22) is open, fluid travels between the controlled port and the valve chamber 730 in a direction essentially perpendicular to a plane of the fluid-contacting layer of piezoelectric actuator 714. The particular configuration of the valve 710 of FIG. 7A and FIG. 7B is similar to that of pump 10 of FIG. 5 in having the orientation of inlet 22 and outlet 24 be parallel to the plane of actuator 714. It should be understood, however, that for the valve 710 the inlet and outlet can be oriented in the manner of FIG. 6 as well.

In the embodiment of FIG. 7A and FIG. 7B, the piezoelectric actuator 714 covers the controlled port (illustrated as inlet 22 in FIG. 7A and FIG. 7B). The other port (e.g., the outlet 24 in FIG. 7A and FIG. 7B) can have, but is not required to have, its own valve. That is, the non-controlled port can have a valve such as an inline flex valve 200 previously described, or a miniature check valve. In the embodiment of FIG. 7A and FIG. 7B, there is only one controlled port, i.e., only one port having a port sealing gasket, and preferably the controlled port is the inlet port. While it would be possible, in another embodiment, to have the port sealing gasket on the outlet port instead of the inlet port, placement of the port sealing gasket at the outlet port can present complications, particularly in exiting of fluid from the chamber.

In one example implementation, the piezoelectric actuator 714 rests upon a valve chamber sealing washer 34 which is 0.020 inch thick and which extends around the periphery of valve chamber 30. The port sealing gasket 737 has the same thickness (0.020 inch thick) as its sits on inlet 22. The mouth 23 of inlet 22 and the mouth of outlet 24 both have diameters of about one eight inch (0.125 inch).

Depending on the size of the valve 710, the input voltage available to driver circuit 718, and the pressure and viscosity of the fluid, the valve 710 can handle flows in a range from microliters per minute up to twenty milliliters per minute. Due to its small size, simple manufacturable design, flow rates, and low current draw, the valve 710 has useful employment in diverse products.

As with other embodiments herein described, the driver circuit 718 can be the same or similar to the drive circuit previously described with reference to FIG. 4, or some other suitable electroluminescent lamp driver, or a micro-controller or micro-processor-based circuit.

Figure 8A:
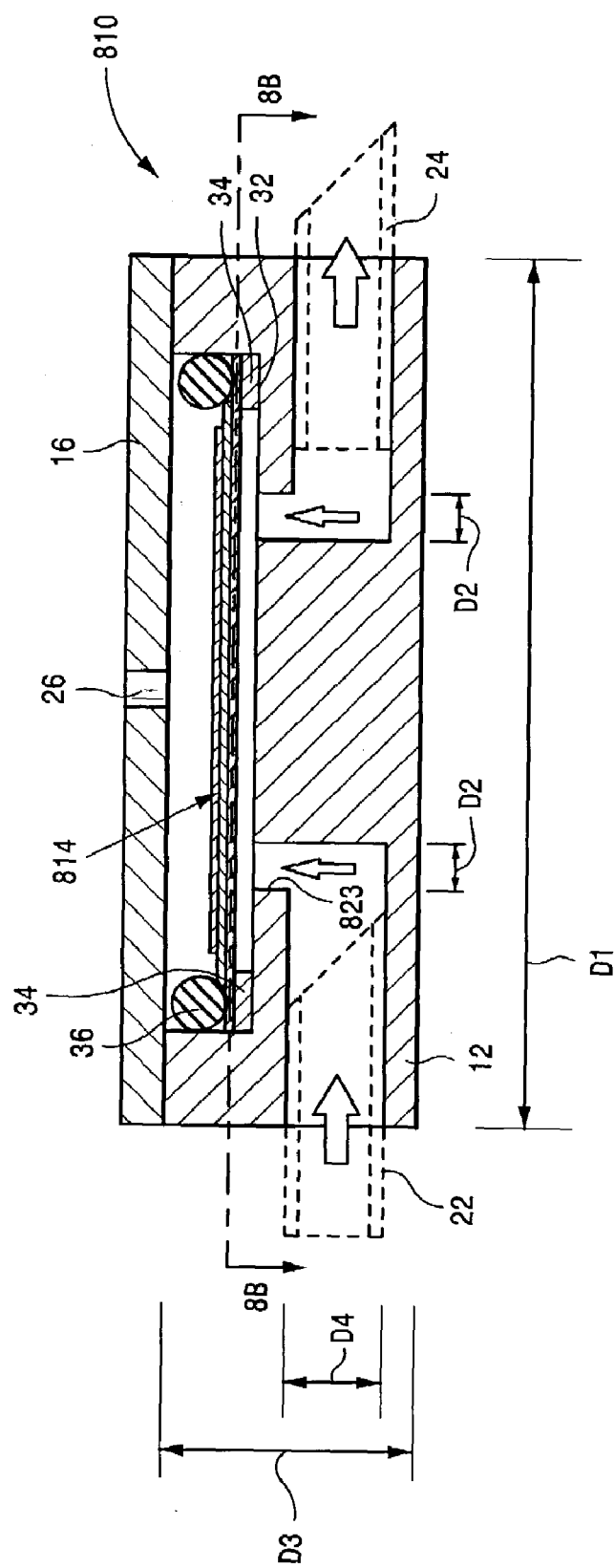
FIG. 8A is a schematic cross sectional front view of a thin chamber pump according to an example embodiment.
Figure 8B:
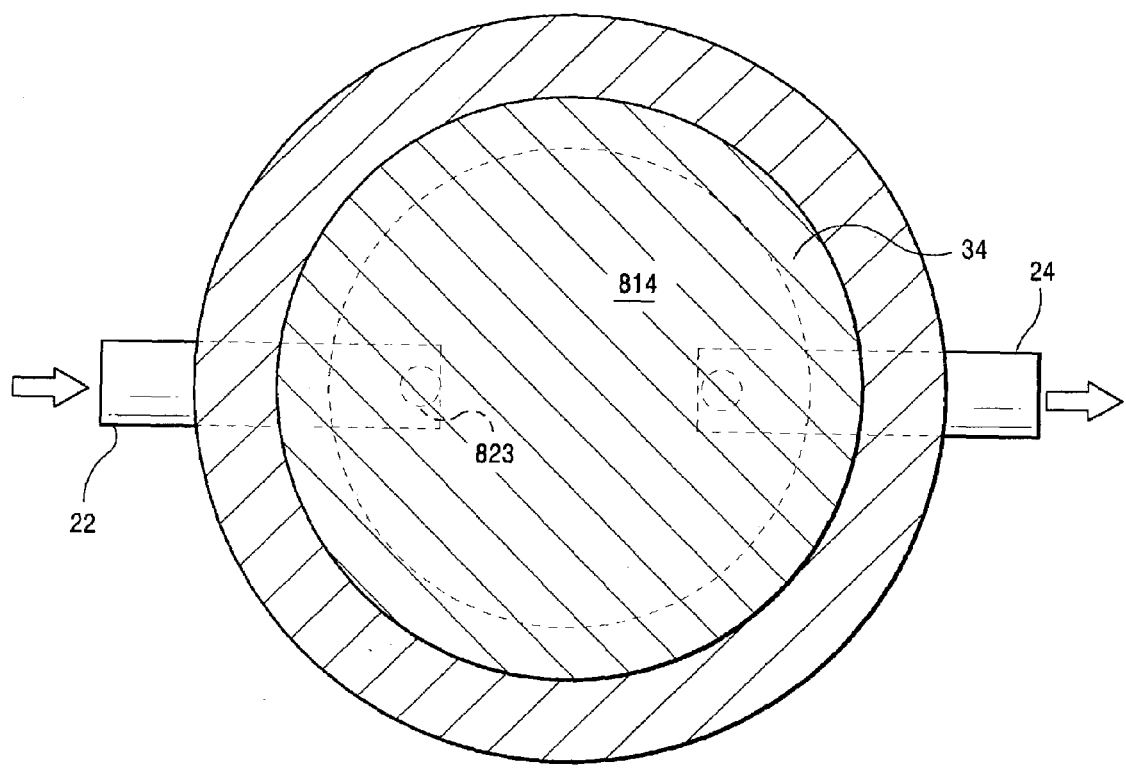
FIG. 8B is a top view of the pump of FIG. 8A taken along the line 8B.

Another thin chamber device is illustrated in FIG. 8A and FIG. 8B. The device of FIG. 8A and FIG. 8B is a pump 810 which resembles the valve of FIG. 7A and FIG. 7B to the extent, e.g., that a piezoelectric actuator rests upon a chamber sealing washer which defines the thickness of the chamber. In particular, piezoelectric actuator 814 rests upon a pump chamber sealing washer 34. In an example implementation of the pump 810, the pump chamber sealing washer 34 has a thickness of approximately 10 mils. Such a small thickness makes the pump 810 self-priming. For the same example implementation, other dimensions D1–D4 as shown in FIG. 8A are follows: D1=1.00 inch; D2=0.156 inch; D3=0.250 inch; D4=0.187 inch. The pump 810 can be as thick as 0.625 inch and still be self-priming.

Figure 9A:
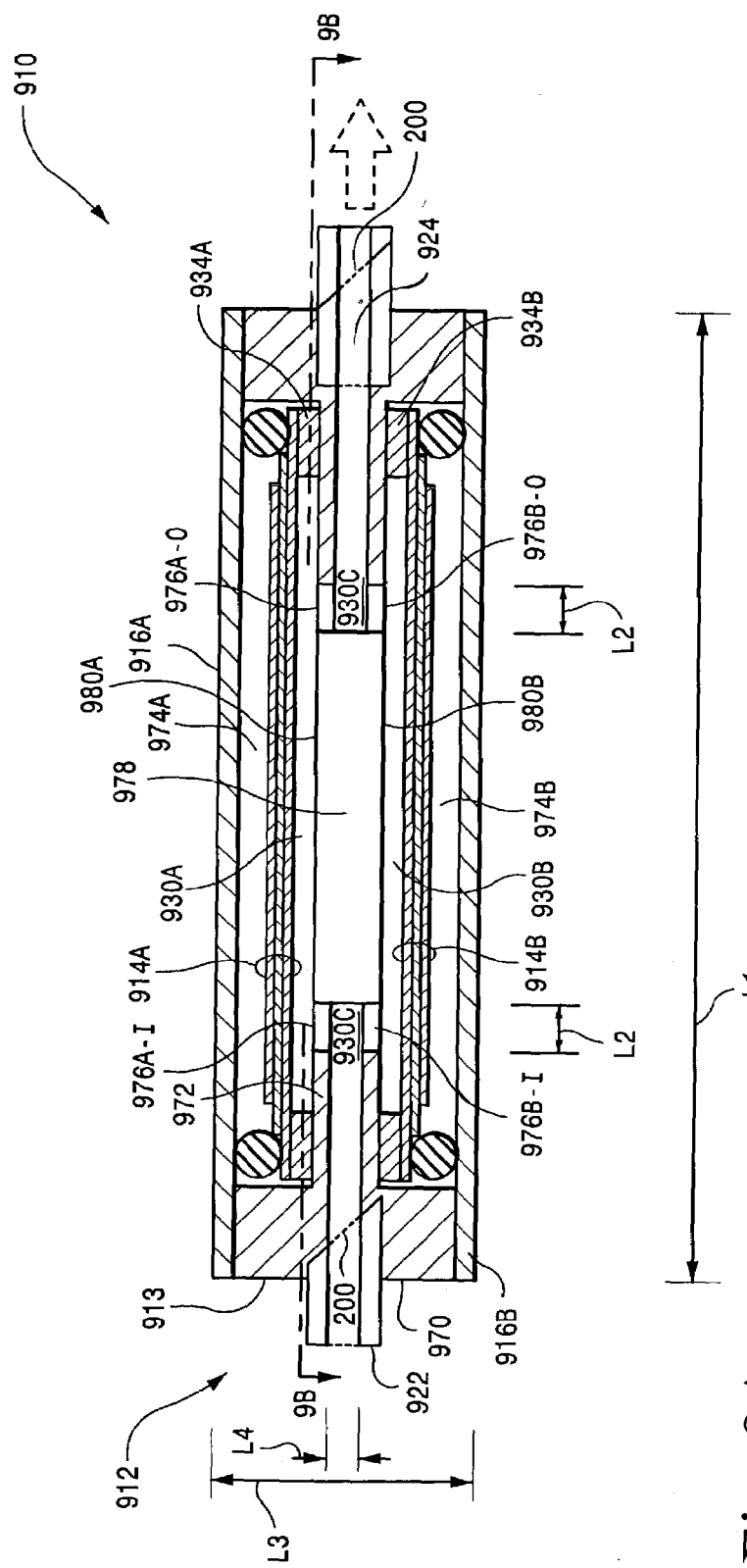
FIG. 9A is a schematic cross sectional front view of a thin chamber pump according to another example embodiment.

It will be noted that the embodiments of FIG. 8A, FIG. 9A, and FIG. 10A happen to be illustrated with the piezoelectric actuators 814, 914, and 1014, respectively, being fabricated in accordance with a first actuator configuration mode. In other words, the metal substrate layers of the piezoelectric actuators 814, 914, and 1014 have a larger diameter than other layers, with the metal substrate layers serving, e.g., as a clamping layer. But as previously indicated, it should be understood that the piezoelectric actuators of these and other embodiments can alternately also be fabricated in the second mode of actuator configuration with two or more layers having a same diameter, particularly when higher pressure is desirable.

Figure 9B:
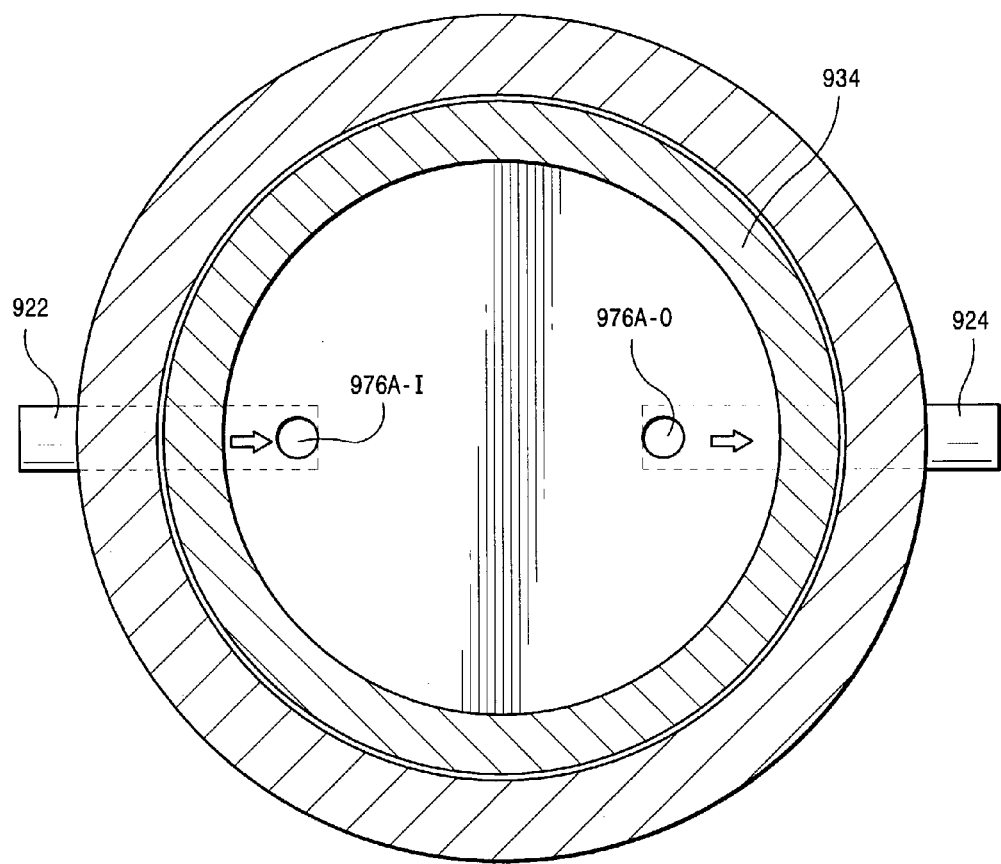
FIG. 9B is a cross sectional top view of the pump of FIG. 9A taken along the line 9B.

FIG. 9A and FIG. 9B shows a variation of the thin chamber pump of FIG. 8A, particularly example pump 910. The pump 910 has body 912 which includes body base 913. The body base 913 has a generally disk shape with a diameter L1. A rim 970 of body base 913 has a greater thickness in an axial direction than does a central wall 972 of body base 913. In FIG. 9A, the axial direction is taken in the plane of the paper to be perpendicular to diameter L1. The greater thickness of rim 970 of body base 913 creates two lateral cavities 974A, 974B on opposing sides of central wall 972. A first pump cover 916A which comprises pump body 912 substantially closes the lateral cavity 974A, while a second pump cover 916B substantially closes the lateral cavity 974B.

The pump body 912 together with two piezoelectric actuators 914A, 914B, define a pumping chamber. The pumping chamber has a pumping chamber first lateral portion 930A bounded in the lateral cavity 974A by piezoelectric actuator 914A, as well as a pumping chamber second lateral portion 930B bounded in the lateral cavity 974B by piezoelectric actuator 914B. In addition, the pumping chamber comprises two pumping chamber central portions 930C which extend axially through central wall 972 to interconnect the pumping chamber first lateral portion 930A and the pumping chamber second lateral portion 930B.

A first of the pumping chamber central portions 930C communicates with inlet port 922; a second of the pumping chamber central portions 930C communicates with outlet port 924. Both inlet port 922 and outlet port 924 extend in a radial direction into the central wall 972 of body base 913 in aligned fashion, as depicted in FIG. 9B. One or both of inlet port 922 and outlet port 924 has a valve, such as the slanted inline flex valve 200 previously described. Use of the slanted inline flex valve 200 allows higher pump flows due to the higher displacement that results from using the dual piezoelectric actuators 914. Other types of valves, such as check valves, may alternatively be employed.

Each lateral portion of the pumping chamber thus has two windows, an input window and an output window, through which fluid travels. The pumping chamber first lateral portion 930A communicates with the inlet port 922 through a pumping chamber first lateral portion first window 976A-I; the pumping chamber first lateral portion 930A communicates with the outlet port 924 through a pumping chamber first lateral portion second window 976A-O. The pumping chamber second lateral portion 930B communicates with the inlet port 922 through a pumping chamber second lateral portion first window 976B-I; the pumping chamber second lateral portion 930B communicates with the outlet port 924 through a pumping chamber second lateral portion second window 976B-O.

The first piezoelectric actuator 914A, when experiencing application of an electric field, acts upon fluid in the pumping chamber first lateral portion 930A. The second piezoelectric actuator 914B, in conjunction with application of the electric field, acts upon fluid in the pumping chamber second lateral portion 930B. A driver circuit 918 actuates the first piezoelectric actuator 914A and the second piezoelectric actuator 914B whereby in a deformed state the first piezoelectric actuator 914A and the second piezoelectric actuator 914B simultaneously draw fluid into the pumping chamber first lateral portion 930A and the pumping chamber second lateral portion 930B, respectively.

A portion of the central wall 972 of body base 913 between the two pumping chamber central portions 930C acts as a diverter 978 to divert fluid introduced by the inlet port 922 toward the pumping chamber first lateral portion 930A and toward the pumping chamber second lateral portion 930B. The diverter 978 has a first wall 980A and a second wall 980B, both of which are essentially parallel to a plane of the piezoelectric actuators when the piezoelectric actuators are unactuated.

In operation, when actuated the first piezoelectric actuator 914A draws fluid through the pumping chamber first lateral portion first window 976A-I, into the pumping chamber first lateral portion 930A, and out the pumping chamber first lateral portion second window 976A-O toward the outlet port 924. Similarly and essentially simultaneously, the second piezoelectric actuator 914B draws fluid through the pumping chamber second lateral portion first window 976B-I, into the pumping chamber second lateral portion 930B, and out the pumping chamber second lateral portion second window 976B-O toward the outlet port 924.

As in various preceding embodiments, a first sealing member 934A extends around a periphery of the pumping chamber first lateral portion 930A to define a height of the pumping chamber first lateral portion 930A (between the first piezoelectric actuator 914A when unactuated and the body 912). Similarly, a second sealing member 934B extends around a periphery of the pumping chamber second lateral portion 930B and defines a height of the pumping chamber second lateral portion 930B (between the second piezoelectric actuator 914B when unactuated and the body 912). In the particular embodiment shown, the thickness of the pumping chamber lateral portions 930A and 930B in an axial direction is defined by a thickness of pumping chamber sealing washers 934A and 934B, respectively. Each of the pumping chamber sealing washers 934 can be, for example, an essentially flat gasket. In view of the thickness of the pumping chamber sealing washers 934, the height or thickness of each of the pumping chamber first lateral portion 930A and the pumping chamber second lateral portion 930B is 20 mils or less, and preferably on the order of 10 mils. Each piezoelectric actuator 914 is retained within its respective lateral cavity 974 by having a peripheral portion of the piezoelectric actuator 914 sandwiched between the pumping chamber sealing washer 934 and another sealing member, such as an O-ring seal 936.

For an example implementation of the embodiment shown, the lengths L1–L4 have the respective values: L1=1.125 inch; L2=0.156 inch; L3=0.250 inch; L4=0.156 inch. If required, the inlet port 922 and outlet port 924 can be modified to make the pump even thinner (e.g., to make L3 even smaller).

The fact that the thicknesses of the pumping chamber first lateral portions 930 is 20 mils or less advantageously renders the pump self-priming.

FIG. 10A, FIG. 10B, and FIG. 10C show another variation of the thin chamber pump of FIG. 8, particularly pump 1010. The pump 1010 has body 1012 which includes body base 1013. The body base 1013, also being of a disk shape, is generally thicker in the axial direction than body base 913 in order to accommodate a differing diverter shape and window configuration. In particular, each lateral portion 1030A, 1030B of the pumping chamber of the FIG. 10A–FIG. 10C embodiment has one window toward the diverter 1078 and the pumping chamber central portions. The pumping chamber first lateral portion 1030A communicates with the inlet port 1022, the outlet port 1024, and the pumping chamber central portions through a pumping chamber first lateral portion window 1076A. Likewise, the pumping chamber second lateral portion 1030B communicates with the inlet port 1022, the outlet port 1024, and the pumping chamber central portions through a pumping chamber second lateral portion window 1076B.

In the FIG. 10A–FIG. 10C embodiment, the first window 1076A and the second window 1076B both preferably have an elliptical shape, as shown in FIG. 10B. The pumping chamber first lateral portion 1030A and the pumping chamber second lateral portion 1030B both have a disk shape and lie in respective first and second planes, the first and second planes being parallel planes. A projection of a circumference of the first pumping chamber 1030A on the first plane is a circle. A projection of a circumference of the first window 1076A on the first plane is a ellipse having an axis 1082 which, when extended, forms a chord of the circle.

The function of the diverter 1078 is to divert fluid introduced by the inlet port toward the pumping chamber first lateral portion 1030A and toward the pumping chamber second lateral portion 1030B. The diverter has a diverter first edge 1084A proximate the first window 1076A and a diverter second edge 1084B proximate the second window 1076B. The first piezoelectric actuator 1014A draws fluid around the diverter first edge 1084A from the inlet port 1022 to the outlet port 1024. Likewise, the second piezoelectric actuator 1014B draws fluid around the diverter first edge 1084B from the inlet port 1022 to the outlet port 1024.

When unactuated, the first piezoelectric actuator 1014A lies in a first plane and the second piezoelectric actuator 1014A lies in a second plane. In a third plane which is perpendicular to the first plane and the second plane, the diverter strut 1078 has a quadrilateral cross-sectional shape. In particular, in the third plane two corners 1086I and 1089O of the quadrilateral are aligned with a fluid flow axis 1088 of the inlet port 1022 and the outlet port 1024.

As in the preceding embodiment, a first sealing member 1034A extends around a periphery of the pumping chamber first lateral portion 1030A to define a height of the pumping chamber first lateral portion 1030A between the first piezoelectric actuator 1014A when unactuated and the body 1012. Similarly, a second sealing member 1034B extends around a periphery of the pumping chamber second lateral portion 1030B and defines a height of the pumping chamber second lateral portion 1030B between the second piezoelectric actuator 1014B when unactuated and the body 1012. In the particular embodiment shown, the thickness of the pumping chamber lateral portions 1030A and 1030B in an axial direction is defined by a thickness of pumping chamber sealing washers 1034A and 1034B, respectively. Each of the pumping chamber sealing washers 1034 can be, for example, an essentially flat gasket. In view of the thickness of the pumping chamber sealing washers 1034, the height or thickness of each of the pumping chamber first lateral portion 1030A and the pumping chamber second lateral portion 1030B is 20 mils or less, and preferably on the order of 10 mils. Each piezoelectric actuator 1014 is retained within its respective lateral cavity 1074 by having a peripheral portion of the piezoelectric actuator 1014 sandwiched between the pumping chamber sealing washer 1034 and another sealing member, such as an O-ring seal 1036.

As in other embodiments, the fact that the thicknesses of the pumping chamber first lateral portions 1030 is 20 mils or less advantageously renders the pump self-priming.

The pump 1010 thus has dual piezoelectric actuators 1014. The pump 1010 is capable of pumping liquids, having a viscosity approximating that of water, at a rate of over one liter per minute. The pump housing or pump body has two working chambers (e.g., 1030A and 1030B) on opposite sides of the pump, with a piezoelectric actuator 1014 for each chamber working in opposition to each other. The inlet and outlet of the fluid is through the center of the pump 1010. Due to the amount of fluid that the piezoelectric actuators 1014 can pump together, the inlet port 1022 and the outlet port 1024 must be of sufficient interior diameter (ID) to meet the needs of the piezoelectric actuators 1014. For the size described in the example implementation, the inlet port 1022 and the outlet port 1024 have diameters of about one quarter inch (0.25 inch) ID. The chambers 1030A and 1030B are connected in the center of the pump so that the fluid drawn in by the piezoelectric actuators 1014 to their respective chambers 1030 is taken from the same intake port. When the fluid is compressed, the fluid exits the pumping chambers into a common outlet port 1024. This technique of using a common inlet port 1022 and a common outlet port 1024 makes the pump extremely efficient, and makes it appear as if a single piezoelectric actuator is pumping the fluid. Flows, depending on voltage and frequency of the driver circuit 1018, can be as high as 1.3 liters per minute.

Thus, as with some other embodiments described herein, the pump 1010 uses two piezoelectric actuators 1014. In one mode of operation, the two piezoelectric actuators 1014 can be operated in-phase with one another, e.g., with both actuators working simultaneously to draw fluid into the pump 1010 and then to squeeze the fluid out of pump 1010 from its individual chambers 1030. In other modes, the two piezoelectric actuators 1014 can be operated out of phase, or in a different phase relationship.

The inlet port 1022 and outlet port 1024 and preferably both equipped with valves. While valves of various types may be utilized for these ports, usage of the slant inline flex valve 200 enhances efficiency of the pump 1010. Unlike the normal check valve which is normally either open or closed, the slant inline flex valve 200 responds to the needs of the piezoelectric actuators 1014. The inline flex valve 200 is biased closed and allows only the amount of fluid to enter the pumping chamber 1030 as demanded by its respective piezoelectric actuator 1014. Since the inline flex valve 200 is biased closed, it does not have to be closed by the piezoelectric actuator 1014. As soon as fluid enters the pumping chamber 1030 as commanded by the respective piezoelectric actuator 1014, the inline flex valve 200 automatically closes. The automatic closing is a function of the flexing membrane of the piezoelectric actuator 1014 and thus does not require energy from the piezoelectric actuator 1014 to close. The pump 1010 is approximately ten percent more efficient when using only one inline flex valve 200 (on the inlet port 1022) than when using two inline flex valves 200 (one on inlet port 1022 and one on outlet port 1024). However, when two inline flex valves 200 are used, the pump 1010 can be self-priming since employment of the two valves may create a sufficient vacuum to draw fluid into the chamber.

Figure 11A:
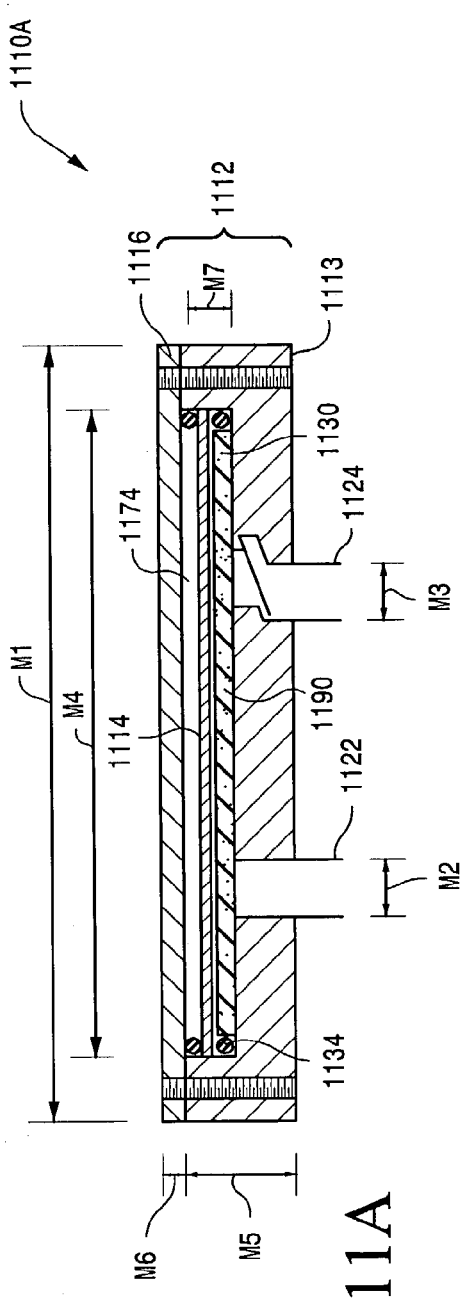
FIG. 11A is a schematic cross sectional front view of a first example embodiment of a thin chamber pump which uses a wicking material.
Figure 11B:
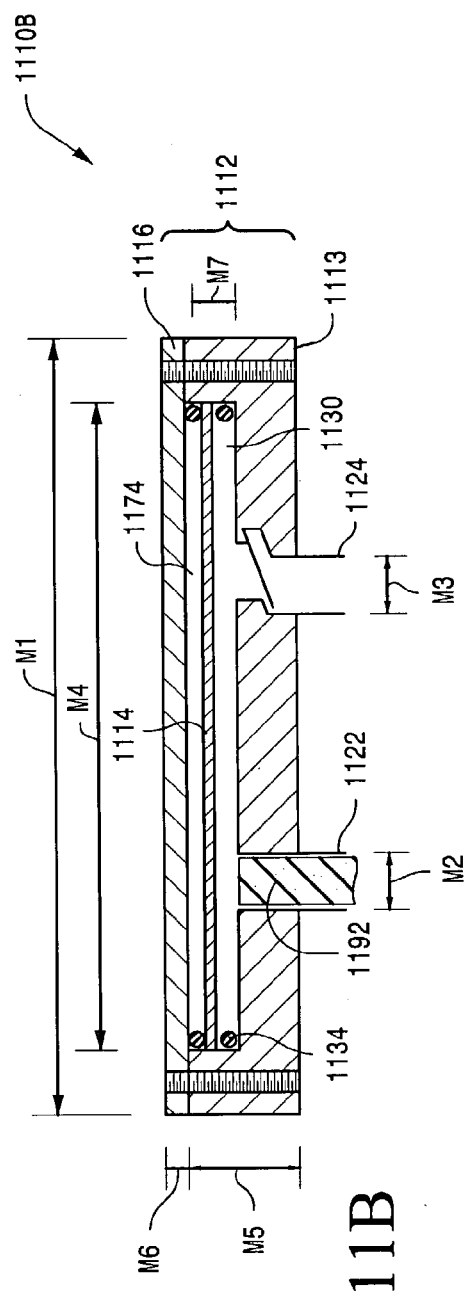
FIG. 11B is a schematic cross sectional front view of another example embodiment of a thin chamber pump which uses a wicking material.
Figure 11C:
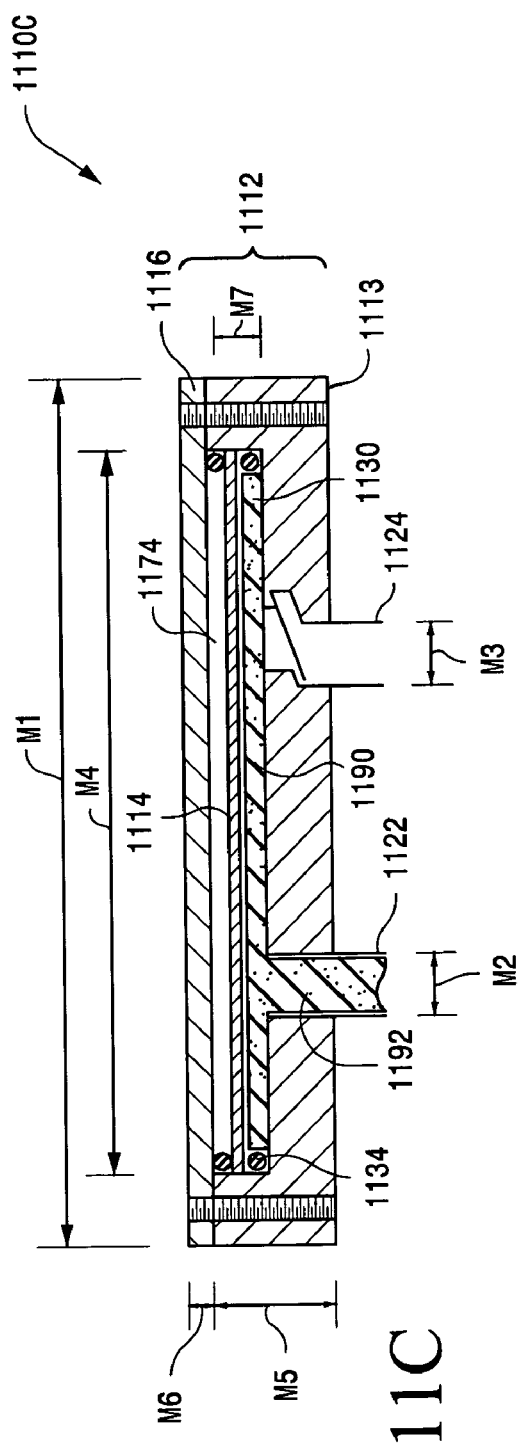
FIG. 11C is a schematic cross sectional front view of yet another example embodiment of a thin chamber pump which uses a wicking material.

FIG. 11A, FIG. 11B, and FIG. 11C show representative implementations of three other embodiments of thin chamber pumps, particularly pumps 1110A of FIG. 11A, pump 1110B of FIG. 1B, and pump 1110C of FIG. 11C. Each of pump 1110A, pump 1110B, and pump 1110C has a body 1112 comprising a body base 1113 and pump cover 1116. The body base 1113 has a cavity 1174 which accommodates a disk-shaped piezoelectric actuator 1114. The piezoelectric actuator 1114 can be fabricated according to either the first mode of actuator configuration or the second mode of actuator configuration, as previously discussed. A rim of piezoelectric actuator 1114 sits on pumping chamber sealing member 1134 in cavity 1174. A sealing member 1136 retains piezoelectric actuator 1114 in cavity 1174 between sealing member 1134 and pump cover 1116. A pumping chamber 1130 is defined between piezoelectric actuator 1114 and pump body base 1113. The pumping chamber 1130 has an inlet port 1122 and an outlet port 1124. The sealing member 1134, which extends around an inner periphery of the pumping chamber 1130, defines a height of pumping chamber 1130 between the piezoelectric actuator 1114 (when unactuated) and the body 1113.

The pump 1110A of FIG. 10A, pump 1110B of FIG. 10B, and the pump 1110C of FIG. 10C utilize a wicking material for, e.g., the purpose of facilitating priming of the pump with a liquid by capillary action. In the pump 1110A of FIG. 10A, a wicking material 1190 is situated either to fully or partially occupy the pumping chamber 1130. In an embodiment in which the wicking material 1190 essentially fills the pumping chamber 1130, the wicking material 1190 has substantially the shape of the pumping chamber 1130.

For example, in an embodiment in which pumping chamber 1130 and piezoelectric actuator 1114 are essentially disk-shaped, the wicking material 1190 is also shaped essentially as a disk. In an example such implementation, the piezoelectric actuator 1114 (and hence the wicking material 1190) has a diameter of one inch or less.

It is not necessary that the wicking material 1190 fill the pumping chamber 1130, as other configurations and shapes of wicking material 1190 which occupy less than the maximum capacity of pumping chamber 1130 are also possible. Preferably, however, the wicking material 1190 is situated in pumping chamber 1130 to overlie or contact the inlet port 1122, and (in some embodiments) possibly the outlet port 1124 as well.

In one example embodiment, the wicking material is a micro fiber fabric or a wicking foam material, examples of which are well known. Although the wicking material 1190 may or may not fill the pumping chamber 1130, the wicking material 1190 is preferably not compressed by movement of piezoelectric actuator 1114. It will be appreciated, particularly in view of previously described embodiments, that the piezoelectric actuator 1114, in conjunction with application of an electric field to a piezoelectric material, acts upon a liquid in pumping chamber 1130.

Figure 12A:
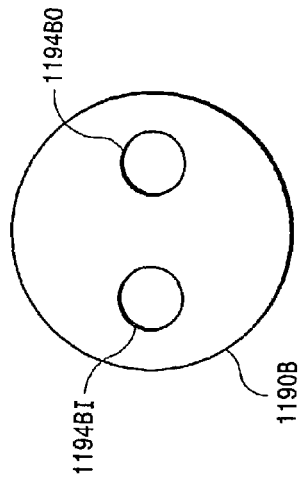
FIG. 12A–FIG. 12D are top views of a differing embodiments of wicking material usable with the pump of FIG. 11A.
Figure 12B:
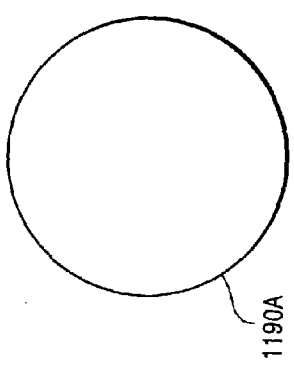

The wicking material 1190 may have various features which facilitate its wicking operation or operation of pump 1110 in general. In contrast to the essentially continuous or featureless wicking material 1190(A) shown in FIG. 12A, the wicking material 1190(B) of FIG. 12B has a first hole 1194BI which, when the wicking material 1190B is inserted in pumping chamber 1130, is aligned with inlet port 1122. Moreover, wicking material 1190(B) has second hole 1194BO which is aligned with the outlet port 1124.

Figure 12C:
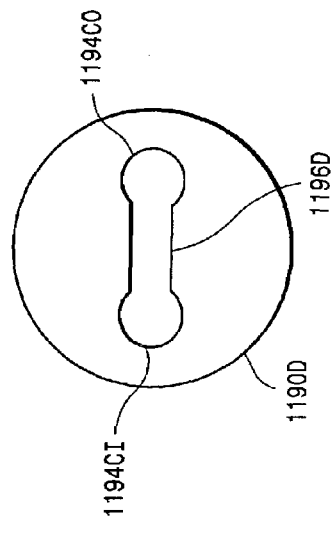
Figure 12D:
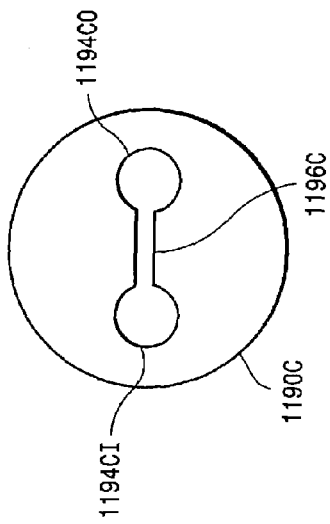

The wicking material 1190(C) of FIG. 12C also has holes 1194CI and 1194CO, with the holes 1194CI and hole 1194CO being connected by a channel 1196C which extends along a line from a center of hole 1194CI to a center of hole 1194CO. The channel 1196C of wicking material 1190(C) is a rather narrow slit. The wicking material 1190(D) of FIG. 12D, on the other hand, has two holes holes 1194DI and 1194DO which communicate via a wider channel 1196D.

Instead of or in addition to a pump having wicking material (such as wicking material 1190) in its pumping chamber, the inlet port 1122 of a pump may also contain wicking material. Such wicking material can either fully or partially occupy the inlet port. For example, pump 1110B of FIG. 11B illustrates wicking material 1192 situated in inlet port 1122. The wicking material in the inlet port can be of considerable length, even longer than a tube or the like connected to the inlet port, so long as the vertical draw of the wicking material is sufficient to accomplish the desired capillary action. FIG. 11C illustrates pump 1110C having both wicking material 1190 in the pumping chamber 1130 and wicking material 1192 situated in inlet port 1122. In the embodiment of FIG. 11C, the wicking material 1192 may be integral with wicking material 1190, or (more likely) separately formed but positioned in inlet port 1122 for physical contact with wicking material 1190 in pumping chamber 1130.

The pumps 1110A, 1110B, and 1110C are thus miniature piezoelectric diaphragm pumps which are self-priming. These pumps are very small, in one example implementation having measurements M1 through M7 has shown in FIG. 11A, FIG. 11B, and FIG. 11C (with all measurements in inches) M1=0.625; M2=0.060; M3=0.125; M4=0.50; M5=0.250; M6=0.03; M7=0.81.

As used herein, "self priming" means that a pump can start pumping liquid without having mechanically to draw water into the pumping chamber. In order to self-prime, the diaphragm must create a vacuum in the pumping chamber to pull water into the pump. To create the vacuum, the diaphragm must expand and compress the air in the pumping chamber to displace the air and create a vacuum to pull fluid into the pump and start pumping liquid. Traditionally, a piezoelectric pump with a diaphragm smaller than one inch is incapable of creating sufficient diaphragm displacement to be self-priming.

Figures 3, 13:
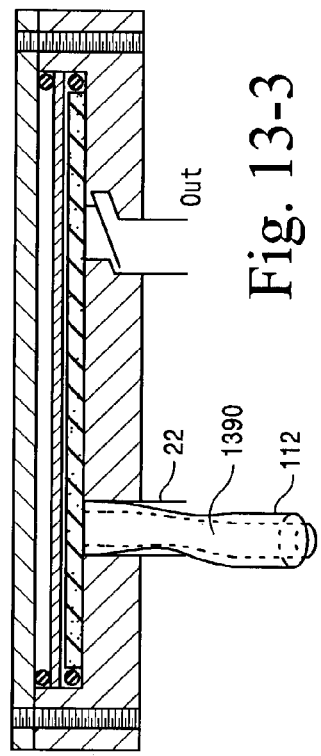
Figures 1, 13:
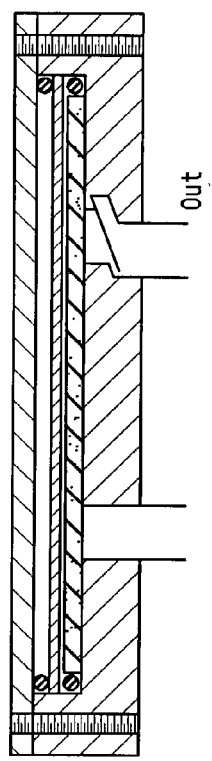
Figures 2, 13:
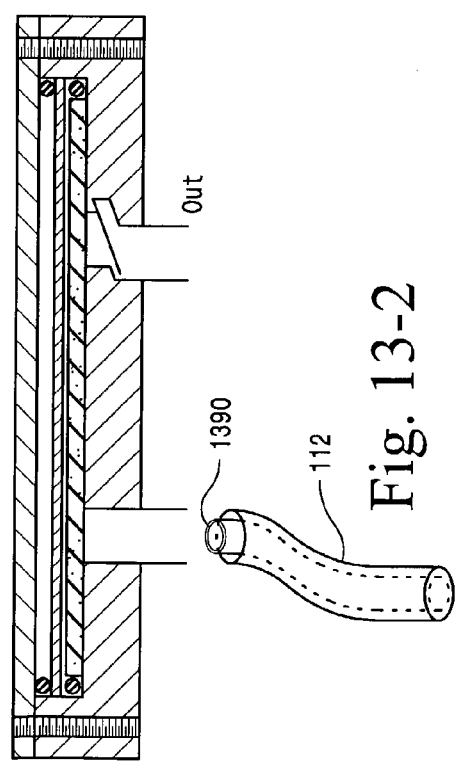
Figures 4, 13:
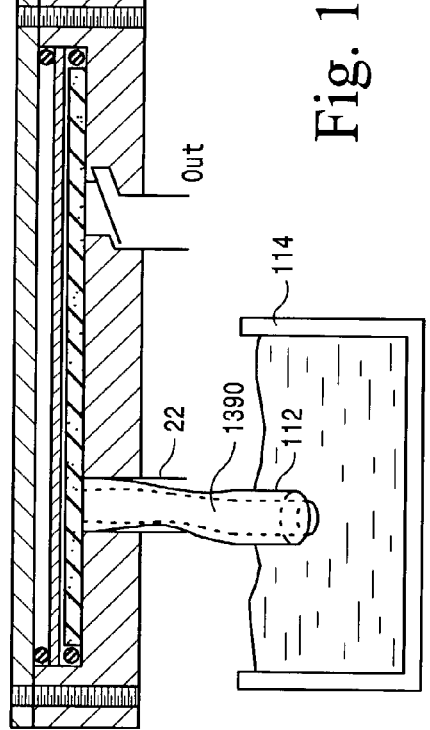
Figures 5, 13:
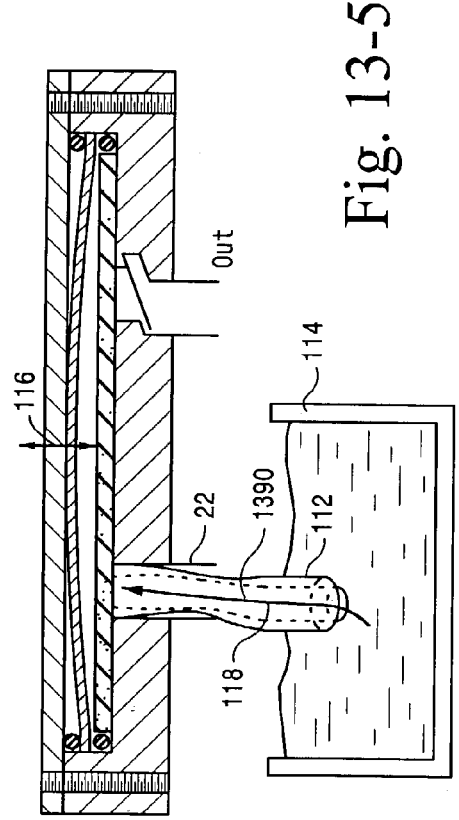

The example pumps 1110A, 1110B, 1110C (collectively referenced as pump 1110), and variations thereof, can be operated in accordance with techniques which get liquid into the pumping chamber 1130, thereby reducing air in the pump and allowing the pump to self prime. FIG. 13-1 through FIG. 13-5 illustrate certain basic, representative steps of a method of self-priming a pump such as pump 1110 of FIG. 11A.

As a first step, the wicking material is inserted into the pumping chamber. This first step is depicted in FIG. 13-1, which shows wicking material 1190 in pumping chamber 1130. Note that the particular implementation shown in FIG. 13-1, unlike that of FIG. 11B and FIG. 11C, does not have wicking material 1192 in inlet port 1122. Yet techniques suitable for pumps of FIG. 11B and FIG. 11C are understandable also from the present description. Although any wicking material can be used, micro fiber fabric or wicking foam material is preferred. These materials are known for their wicking capability through capillary action of the liquid. The wicking material 1190 may fill all or part of the pumping chamber 1130, but in either case in a manner so that the wicking material 1190 will not be compressed by movement of piezoelectric actuator 1114.

Either subsequently or previously to the first step, as a second step a wicking material 1390 is also inserted into a vessel 112 such as a tube or hose (see FIG. 13-2) Optimally, the vessel 110 has an internal diameter of less than one eight inch, and the wicking material 1390 is the same material as wicking material 1190. For wicking material 1390, a micro fiber material is preferred to wicking foam. The wicking material 1390 must not be compressed in vessel 112 in order not to impede or hamper the wicking (capillary) action.

Figure 3:
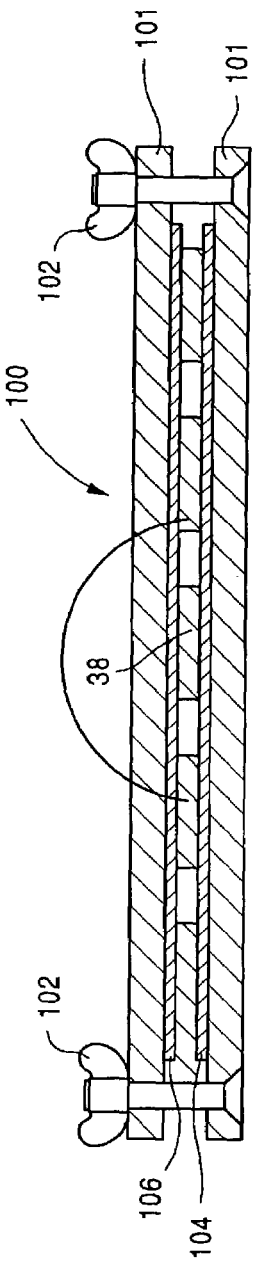
FIG. 3 is a sectional view of the press used to make the piezoelectric actuators of the invention.

Then, as a third basic step, a first end of the vessel 112 is inserted into or situated proximate the pumping chamber so that the wicking material 1390 in the vessel 112 contacts the wicking material 1190 in the pumping chamber 1130 (see FIG. 13-3). For example, the vessel 112 may be inserted into inlet port 1122 so that the first end of the vessel 112 contacts the wicking material 1190 in pumping chamber 1130. It is important that the wicking material 1390 in the vessel 112 actually physically contacts or touches the wicking material 1190 in pumping chamber 1130. Such contact enables the liquid being wicked up the vessel 112 to be transferred to wicking material 1190 in pumping chamber 1130.

As a fourth basic step, the second end of the vessel 112 is then inserted into a liquid, such as liquid in liquid reservoir 114 (see FIG. 13-4). Immersion or contact of the second end of vessel 112 with the liquid facilitates the capillary action performed by wicking material 1390 and wicking material 1190. Of course, if the pump is provided with wicking material such as wicking material 1192 of the FIG. 11B or FIG. 11C implementation, and such wicking material is sufficient long to extend into liquid reservoir 114, the wicking material 1192 may be utilized in lieu of the wicking material 1390 illustrated for the pump 1110A of the FIG. 11A implementation.

For the fifth basic step, the pump 1110 is turned on so that piezoelectric actuator 1114 is actuated (see FIG. 13-5). Turning on the pump 1110 starts movement of piezoelectric actuator 1114, as indicated by arrow 116 in FIG. 13-5. Further, the wicking action draws liquid into pumping chamber 1130, as shown by arrow 118. When the amount of liquid drawn into pumping chamber 1130 by capillary action displaces sufficient air in pumping chamber 1130 for the pump 1110 to overcome the expansion and contraction of air, the pump 1110 will start pumping regularly.

Yet another thin chamber device is illustrated in FIG. 14A. The device of FIG. 14A is a diaphragm pump 1410 which comprises body 1412 for at least partially defining a shallow cylindrical pumping chamber 1430. The pumping chamber 1430 has an inlet port 1422 and an outlet port 1424. In the particular implementation shown in FIG. 11, the body 1412 has a body base 1413 and a body cover 1416.

The pump 1410 has a diaphragm 1414 situated in the pumping chamber 1430. In similar manner as piezoelectric actuator 714 above described, the diaphragm 1414 sits on sealing washer 34 (known in the FIG. 14A embodiment as pumping chamber sealing washer 34). The circular periphery of diaphragm 1414 is sandwiched between pumping chamber sealing washer 34 and O-ring seal 36.

The diaphragm 1414 acts upon a fluid in the pumping chamber 1430. Preferably action of the diaphragm 1414 is in response to application of an electromagnetic field to a piezoelectric element. The piezoelectric element may actually comprise the diaphragm 1414 (in the manner of piezoelectric wafer 38 comprising actuator 14 in FIG. 2, for example). Alternatively, the diaphragm 1414 may be mechanically connected to a piezoelectric member which moves, and which thereby causes the diaphragm 1414 to move, in response to application of the electromagnetic field. For example, see the mechanical connection in FIG. 15A.

At least one, and preferably both, of inlet port 1422 and outlet port 1424 of the pump 1410 of FIG. 14A is provided with a flapper valve 1450. Each flapper valve 1450 is a thin wafer, preferably circular in shape (see FIG. 14B), having an arcuate cut 1452 formed therein.

For inlet port 1422, flapper valve 1450 is situated in a recessed seat 1454 provided on a chamber-facing surface of body base 1413. For outlet port 1424, flapper valve 1450 is situated in a recessed seat 1456 on a chamber-opposing face of body base 1413. The flapper valves 1450 are held in place in their respective recessed seats 1454 by a retainer element 1457 which is pressed into place around the edges of the flapper valve 1450. Preferably, the retainer element 1457 is circular.

Preferably each flapper valve 1450 is a thin silicon wafer. In one implementation, the flapper valve 1450 has a diameter of about 0.37 inch and a thickness of about 0.002 inch. As shown in FIG. 14B, the arcuate cut 1452 is a substantially U-shaped cut. In the illustrated implementation, the arcuate cut 1452 extends along 0.25 inch of the diameter of flapper valve 1450. The arcuate cut 1452 serves to form a flexible flapper 1458 which is shaped somewhat as a peninsula in the interior of flapper valve 1450. The flapper 1458 of flapper valve 1450 has a modulus which forces the flapper valve 1450 to close after the piezoelectric element has functioned to fill the chamber 1430, but which also causes automatic closure of valve 1450 without requiring the pressure of the piezoelectric element for the closure. For example, considering a flapper valve 1450 installed in inlet port 1422, when the diaphragm 1414 moves to draw fluid into pumping chamber 1430 in the direction depicted by arrow 1460 in FIG. 14C, the flexible flapper 1458 flexes or moves also in the direction of arrow 1460. Conversely, considering the flapper valve 1450 in outlet port 1424, when the diaphragm 1414 is actuated to drive fluid out of diaphragm 1414 in the direction depicted by arrow 1464, the flexible flapper 1458 of the flapper valve 1450 in outlet port 1424 also flexes in the direction of arrow 1462.

The flapper valve 1450 is particularly beneficial for replacing metal check valves or the like in small pumps. Advantageously, the thin flapper valve 1450 facilitates overall a thinner pump. Whereas conventional metal check valves have a thickness on the order of about 0.093 inch, the flapper valve 1450 has a thickness of about 0.002 inch. In the illustrated implementation, such small thickness for flapper valve 1450 means that the pump 1410 can have an overall thickness (in the direction of arrow 1460) as small as 0.125 inch. As such, the pump 1410 is particularly advantageous for use in fuel cells, fountains and cooling solutions as well as drug infusion pumps in the medical industry, or in any environment in which small but accurate flows are required. The entire pump 1410 can be either molded in ceramics, injection molded in plastic or milled in metal or plastic.

FIG. 15A, FIG. 15B, FIG. 15C, and FIG. 15D show a valve 1510 which has a valve housing 1512. In the example illustrated embodiment, the valve housing 1512 happens to be essentially rectangular in shape. Internal to valve housing 1512 is a valve chamber 1530.

The valve chamber 1530 has at least one elastomeric wall 1530W. Preferably, all walls of valve chamber 1530 are of elastomeric composition. More preferably, the entire valve chamber 1530 comprises a unitary elastomeric part. It is advantageous that the elastomer be a solvent resistant elastomer.

The valve chamber 1530 has both an inlet port 1522 and an outlet port 1524. At least one of the inlet port 1522 and the outlet port 1524 is considered to be a "controlled port". In the specific example implementation shown in FIG. 15A–FIG. 15D, the outlet port 1524 is considered to be the controlled port for reasons explained below.

Within valve housing 1512 but external to valve chamber 1530 is a piezoelectric actuator element 1514, e.g., a piezoelectric bimorph. The piezoelectric actuator 1514 is operable in a first state to configure the elastomeric wall 1530W of the valve chamber 1530 to a first position (illustrated in FIG. 15A) to close the controlled port (e.g., outlet port 1524). The piezoelectric actuator 1514 is also operable in a second state to configure the elastomeric wall 1530W of valve chamber 1530 to a second position (illustrated in FIG. 15B) to open the controlled port.

In the illustrated example implementation, the piezoelectric actuator 1514 is a cantilever-shaped piezoelectric element. The piezoelectric actuator 1514 has an essentially stationary proximal end and a distal end which is connected to the elastomeric wall 1530W of the valve chamber 1530. An actuator rod 1598 connects the distal end of piezoelectric actuator 1514 to the elastomeric wall 1530W of valve chamber 1530. In particular, actuator rod 1598 has a distal end which extends through the elastomeric wall and terminates in an actuator head 1599. When the piezoelectric actuator 1514 is in the first position, the actuator head 1599 closes the controlled port (e.g., outlet port 1524).

The valve housing 1512 thus substantially encases the valve chamber 1530 and piezoelectric actuator 1514, with the inlet port 1522 and the outlet port 1524 also being formed in valve housing 1512. The piezoelectric actuator 1514 is connected to an unillustrated drive circuit by leads DCL. The drive circuit is external to valve housing 1512. Preferably only the valve chamber 1530 isolates the piezoelectric actuator 1514 from fluid in valve chamber 1530, so that the piezoelectric actuator 1514 is never wet. In an example implementation of valve chamber 1530, each of the measurements N1, N2, and N3 shown in FIG. 15A–FIG. 15D are 0.5 inch.

Figure 15C:
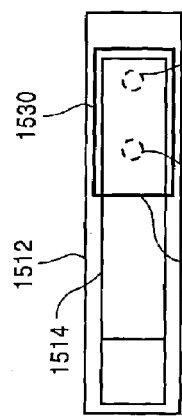
FIG. 15C is a top view of the valve of FIG. 15A.
Figure 15D:
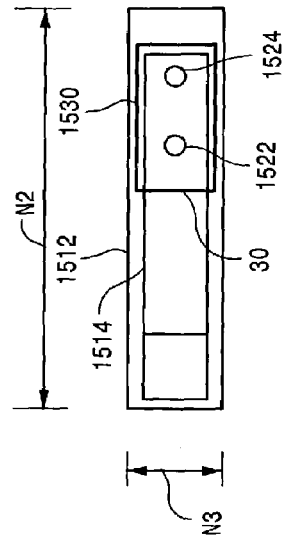
FIG. 15D is a bottom view of the valve of FIG. 15A.
Figure 15A:
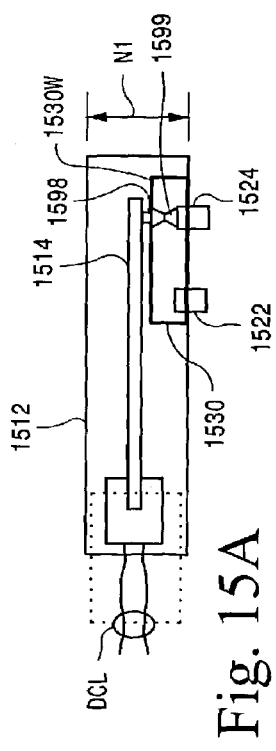
FIG. 15A is a front view of a valve according to an example embodiment showing a piezoelectric actuator in a first position.
Figure 15B:
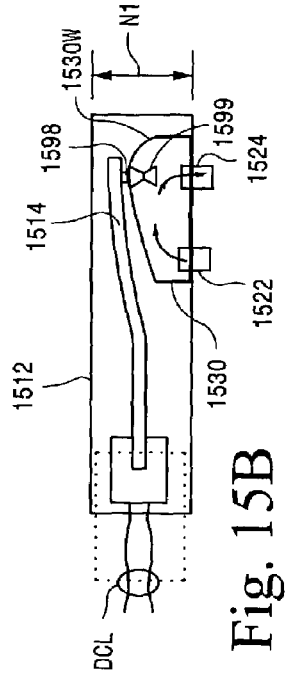
FIG. 15B is a front view of the valve of FIG. 15A showing the piezoelectric actuator in a second position.
Figure 15E:
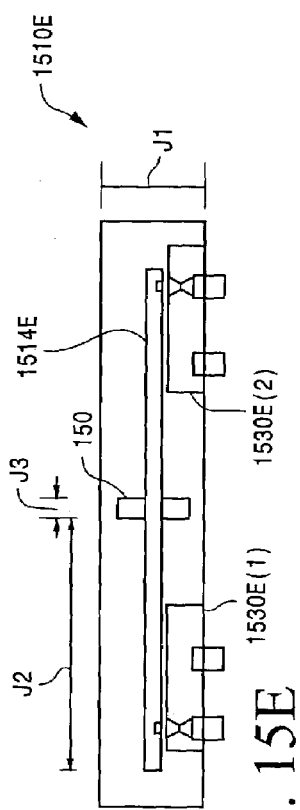
FIG. 15E is a dual chamber valve variation of the valve of FIG. 15A.

FIG. 15E shows a dual chambered valve 1510E which is a variation of the valve 1510 of FIG. 15A–FIG. 15D. The valve 1510E has a winged piezoelectric actuator 1514E which has a central mounting at center support 150. and two winged actuator levers. The valve 1510E has two valve chambers, notably valve chamber 1530E(1) and valve chamber 1530E(2). The measurements J1–J3 of the valve 1510E (in inches) are as follows: J1=0.5; J2=0.750; J3=0.125. In the dual chambered, winged-actuator configuration of FIG. 15E, both winged halves of piezoelectric actuator 1514E are actuated at the same time using the same voltage input. This effectively doubles the efficiency of valve 1510E by allowing two separate fluid sources to be controlled at the same time.

The valve 1510 and valve 1510E allow the pumping volume within valve chamber 1530 to be full of fluid and pressurized at all time to facilitate opening and closing of the valves. The actuator head 1599 is configured to fit flush against the orifice of the controlled port (e.g., outlet port 1524). In the first position shown in FIG. 15A, the actuator head 1599 stops fluid from exiting the outlet port 1524, thus stopping liquid from entering the inlet port 1522. Advantageously, the piezoelectric actuator 1514 lies flat, making the valves thin in the N1 dimension as shown in FIG. 15A and FIG. 15D. The fact that the piezoelectric actuator 1514 is hermetically sealed with respect to the contents of the valve chamber 1530 extends the life of piezoelectric actuator 1514, since the piezoelectric actuator 1514 is not exposed to humidity and contaminates.

This invention has particular application for water cooling of the CPU in computers but may have wider applications wherever a very small pump relatively high flow rate and minimum power consumption is needed to move liquids at very low cost. The piezoelectric actuator by itself can have very many other applications, such as speakers, audible alarms, automotive sensors, sound generators for active noise cancellation, and accelerometers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the driving circuit for the piezoelectric actuator may be situated outside a device body, such as in the manner illustrated in various drawings. Alternatively, the drive circuit can be on a circuit board or the like situation in a cavity defined by the device body and a lid, for example.

What is claimed is:

1. A fluid handling device which acts as both a pump and a valve, comprising:
   a body for at least partially defining a chamber, the chamber having an inlet port and an outlet port, one of the inlet port and the outlet port being a controlled port;
   at least one piezoelectric actuator provided in the chamber, the piezoelectric actuator comprising a piezoelectric element having a fluid-contacting layer adhered thereto;
   the piezoelectric actuator being operable by selective application of an electric field to a first state and a second state, in the first state the fluid-contacting layer of the piezoelectric actuator being positioned against a mouth of the controlled port to prevent transmission of fluid between the chamber and the controlled port, in the second state the piezoelectric actuator being displaced away from the controlled port, a thickness of the chamber being chosen whereby fluid is effectively drawn into the chamber through the inlet port by displacement of the piezoelectric actuator in the second state whereby the device is made self-priming by displacing the piezoelectric actuator.

2. The apparatus of claim 1, further comprising a port sealing gasket situated around the mouth of the controlled port, and wherein in the first state the fluid-contacting layer of the piezoelectric actuator is positioned against the port sealing gasket at the mouth of the controlled port to prevent the transmission of fluid between the chamber and the controlled port.

3. The apparatus of claim 1, further comprising a chamber spacer member which defines the thickness of the chamber between the piezoelectric actuator and an interior floor of the chamber.

4. The apparatus of claim 3, further comprising a port sealing gasket situated around the mouth of the controlled port, and wherein in the first state the fluid-contacting layer of the piezoelectric actuator is positioned against the port sealing gasket at the mouth of the controlled port to prevent the transmission of fluid between the chamber and the controlled port.

5. The apparatus of claim 4, wherein the port sealing gasket has essentially a same thickness as the valve chamber spacer member.

6. The apparatus of claim 3, wherein a thickness of the chamber spacer member is chosen to facilitate self-priming of the apparatus.

7. The apparatus of claim 1, wherein the fluid-contacting layer of the piezoelectric actuator is a stainless steel membrane.

8. The apparatus of claim 1, wherein in the first state the piezoelectric actuator has no electromagnetic field applied thereto, and wherein in the second state the piezoelectric actuator has an electromagnetic field applied thereto.

9. The apparatus of claim 1, wherein when the controlled port is open fluid travels between the controlled port and the valve chamber in a direction essentially perpendicular to a plane of the fluid-contacting layer.

* * * * *